US008244643B2

(12) United States Patent
Coulter et al.

(10) Patent No.: US 8,244,643 B2
(45) Date of Patent: Aug. 14, 2012

(54) SYSTEM AND METHOD FOR PROCESSING FINANCIAL TRANSACTION DATA USING AN INTERMEDIARY SERVICE

(75) Inventors: Todd R. Coulter, Rancho Murieta, CA (US); Mordechai E. Kaplinsky, Brooklyn, NY (US); Christopher E. Lewis, Tempe, AZ (US)

(73) Assignee: FonWallet Transaction Solutions, Inc., Rancho Murieta, CA (US)

( * ) Notice: Subject to any disclaimer, the term of this patent is extended or adjusted under 35 U.S.C. 154(b) by 0 days.

(21) Appl. No.: 12/557,453

(22) Filed: Sep. 10, 2009

(65) Prior Publication Data
US 2010/0121726 A1 May 13, 2010

Related U.S. Application Data

(60) Provisional application No. 61/112,749, filed on Nov. 8, 2008.

(51) Int. Cl.
*G06Q 20/00* (2006.01)
(52) U.S. Cl. ............... 705/67; 705/64; 705/65; 705/66; 705/44; 380/229; 713/155; 713/156; 713/157; 713/158; 713/159; 726/1; 902/2
(58) Field of Classification Search .................. 705/67
See application file for complete search history.

(56) References Cited

U.S. PATENT DOCUMENTS

| 7,357,310 | B2 | 4/2008 | Calabrese et al. | |
|---|---|---|---|---|
| 2002/0138445 | A1 | 9/2002 | Laage et al. | |
| 2002/0143634 | A1* | 10/2002 | Kumar et al. | 705/18 |
| 2003/0216996 | A1* | 11/2003 | Cummings et al. | 705/39 |
| 2005/0222949 | A1 | 10/2005 | Inotay et al. | |
| 2005/0251440 | A1 | 11/2005 | Bednarek | |
| 2008/0010191 | A1 | 1/2008 | Rackley, III et al. | |
| 2008/0010215 | A1 | 1/2008 | Rackley, III et al. | |
| 2008/0172317 | A1* | 7/2008 | Deibert et al. | 705/35 |
| 2008/0288351 | A1 | 11/2008 | Leung et al. | |
| 2009/0192904 | A1 | 7/2009 | Patterson et al. | |

(Continued)

FOREIGN PATENT DOCUMENTS

JP 2011-118898 A 6/2011

(Continued)

OTHER PUBLICATIONS

Krueger, Malte. The Future of M-payments—Business Options and Policy Issues—Background Paper No. 2 Electronic Payment Systems Observatory (ePSO) (Aug. 2001). Retrieved online Sep. 29, 2011. http://ftp.jrc.es/EURdoc/eur19934en.pdf.*

(Continued)

*Primary Examiner* — James A Reagan
(74) *Attorney, Agent, or Firm* — Perkins Coie LLP

(57) ABSTRACT

An acquirer communicates with an intermediary transaction processing service to handle financial transaction requests received from multiple points of purchase. The acquirer receives an initial authorization request generated based on a transaction initiated by a customer at a point of purchase. The initial authorization request includes unique identifying information associated with the customer. The acquirer determines that the unique identifying information is associated with the intermediary service and provides at least part of the initial authorization request to the intermediary service. In response, the intermediary service provides account information to the acquirer. The acquirer then generates a modified authorization request based on the initial authorization request and the received account information and transmits the modified authorization to an issuing institution to request approval of the transaction.

33 Claims, 13 Drawing Sheets

U.S. PATENT DOCUMENTS

| | | |
|---|---|---|
| 2009/0325542 A1 | 12/2009 | Wentker et al. |
| 2010/0121767 A1 | 5/2010 | Coulter et al. |
| 2010/0312636 A1 | 12/2010 | Coulter et al. |
| 2010/0312657 A1 | 12/2010 | Coulter et al. |
| 2010/0312700 A1 | 12/2010 | Coulter et al. |

FOREIGN PATENT DOCUMENTS

| | | | |
|---|---|---|---|
| JP | 2011118898 A | * | 6/2011 |

OTHER PUBLICATIONS

International Search Report and Written Opinion for PCT/US09/63641; Applicant: FonWallet Transaction Solutions, Inc.; Mailing Date: Dec. 15, 2009, 8 pages.

Non-Final Office Action, U.S. Appl. No. 12/859,205, Mail Date Nov. 7, 2011, 21 pages.

Final Office Action, U.S. Appl. No. 12/557,457, Mail Date Apr. 27, 2011, 17 pages.

Krueger, Malte. The Future of M-payments—Business Options and Policy Issues—Background Paper No. 2 Electronic Payment Systems Observatory (ePSO) (Aug. 2011), retrieved online Sep. 29, 2011 at http://ftp/jrc.es/EURdoc/eur19934en.pdf, 33 pages.

Non-Final Office Action, U.S. Appl. No. 12/557,457, Mail Date Sep. 28, 2010, 24 pages.

Non-Final Office Action, U.S. Appl. No. 12/859,213, Mail Date Sep. 29, 2011, 15 pages.

Notice of Allowance, U.S. Appl. No. 12/557,457, Mail-Date Oct. 12, 2011, 17 pages.

* cited by examiner

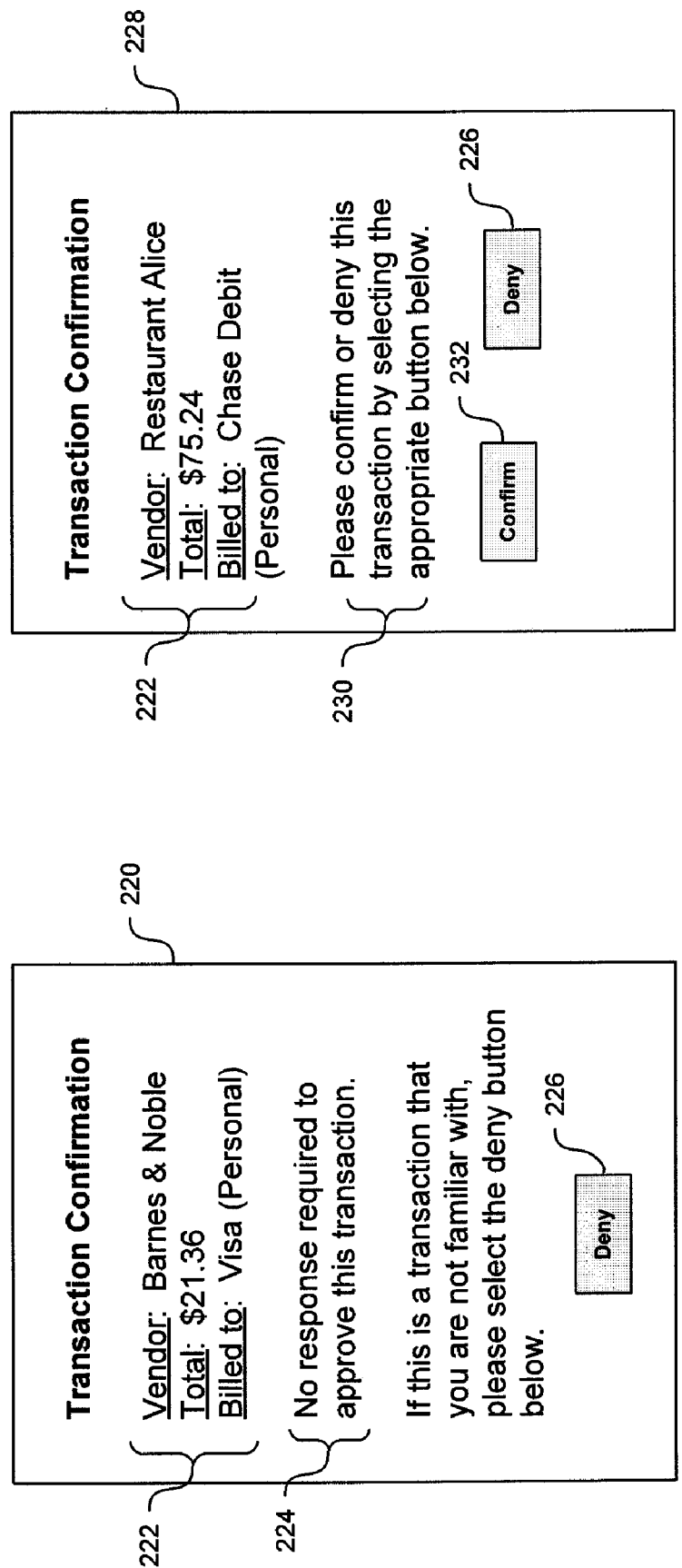

SYSTEM AND METHOD FOR PROCESSING FINANCIAL TRANSACTION DATA USING AN INTERMEDIARY SERVICE

CROSS-REFERENCE TO RELATED APPLICATIONS

This application claims the benefit of U.S. Provisional Application No. 61/112,749, entitled "Mobile Card Access & Authorization," filed on Nov. 8, 2008. This application is related to the concurrently filed U.S. patent application Ser. No. 12/577,457 (now U.S. Pat. No. 8,099,368), entitled "Intermediary Service and Method for Processing Financial Transaction Data with Mobile Device Confirmation."

BACKGROUND

Companies that participate in electronic transaction systems (e.g., transaction systems that process credit cards, debit cards, etc.) must balance a number of competing concerns in their interactions with the systems. As businesses, companies must track their costs in dealing with transaction systems. For example, merchants who accept credit cards are subject to various fees when processing transactions. Merchants may therefore decide to accept certain credit cards and reject others, or require a minimum charge amount when accepting a card for payment, in order to reduce fees. In addition, merchants must track and make policy decisions about how they use and protect personal information associated with transactions. Government regulations and private contracts (e.g., with the credit card associations) set privacy and security requirements that banks and merchants must satisfy. The privacy and security requirements place limits on data security and encryption and also limit the types of data that can be transmitted using different formats. These concerns are interrelated because participants in the system pay lower fees when more customer information is provided with the transaction information. Fees are lower because the additional customer information can generally be retrieved only from the physical card itself, indicating that the card was present at the time of the transaction. Thus, a purchase at a brick-and-mortar business is charged a lower processing fee than a purchase on the Internet, because the brick-and-mortar business is able to transmit more customer information to the credit card company.

Consumers also balance competing concerns. Avoiding losses from fraudulent or erroneous transactions is a particular concern. Currently, some issuing institutions use automated systems that attempt to detect and reject suspicious transactions based on transaction characteristics (e.g., location, amount, etc.). However, these automated systems are often unsuccessful in differentiating legitimate transactions and fraudulent transactions. Otherwise, consumers can generally detect fraudulent or erroneous transactions only by reviewing their bill or statement to verify that every transaction is correct. Reviewing bills is inconvenient because it requires continual vigilance from the consumer. In addition, several days or weeks may pass before an erroneous or fraudulent transaction is detected. Thus, it would be useful to have payment systems that enable consumers to more efficiently detect these incorrect transactions.

Convenience is also a major concern for consumers. The average consumer may pay for purchases using multiple payment instruments, such as credit cards, debit cards, and gift cards. Each payment instrument has a separate card or token and a separate set of identifying information, such as credit/debit card numbers, that must be tracked. Managing multiple payment instruments can therefore be complicated and cumbersome. Thus, it would be useful to consumers to be able to manage multiple payment instruments in a simple fashion.

BRIEF DESCRIPTION OF THE DRAWINGS

FIGS. 3A-3D are representative user interfaces presented to a customer of a mobile device during a financial transaction.

DETAILED DESCRIPTION

Figure 1:
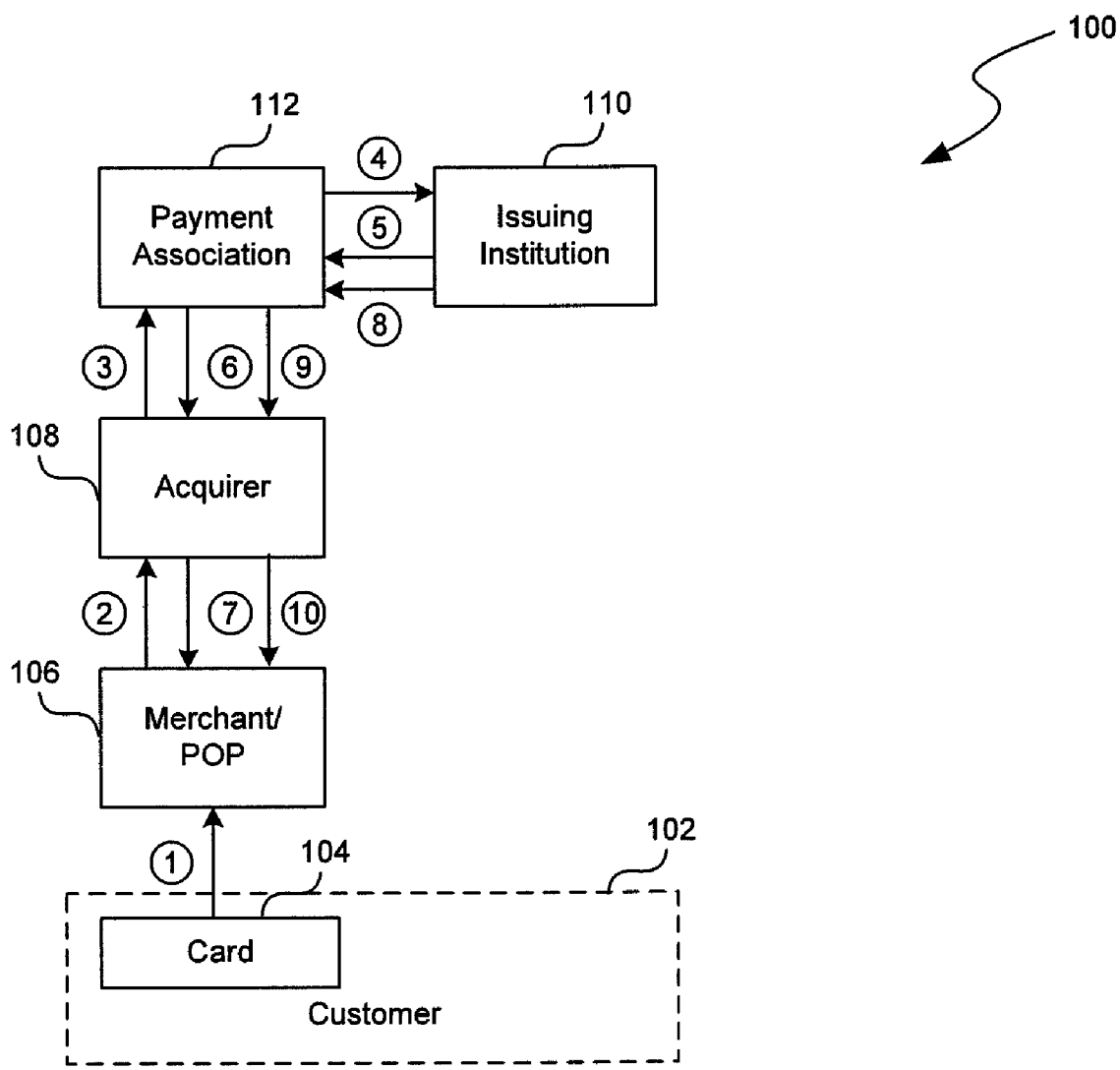
FIG. 1 is a block diagram of a representative environment for processing financial transaction data according to prior art methods.

A transaction processing service that operates as an intermediary between acquirers of financial transaction requests and issuing institutions that process the financial transaction requests is disclosed (hereinafter referred to as "the intermediary service" or "the service"). The intermediary communicates with an acquirer to provide account information that can be used by the acquirer to process the financial transaction requests. The intermediary service utilizes a customer's mobile device as an out-of-band communication channel to notify a customer of a received financial transaction request. In certain circumstances, before continuing to process the received financial transaction request the service must first receive the customer's confirmation of the transaction. By seeking out-of-band confirmation from a customer to a transaction, the disclosed intermediary service thereby significantly reduces the occurrence of fraud without changing or otherwise burdening standard merchant payment processes.

To initiate a transaction, a customer presents a card or token containing unique identifying information to a merchant in order to pay for a purchase. The token may be, for example, an RFID tag or other contactless device for providing the unique identifying information and may be contained in or attached to the customer's mobile device. The merchant transmits the unique identifying information to an acquirer (i.e., a financial institution that provides a clearinghouse service for consolidating financial transactions) in an initial authorization request. The acquirer recognizes that the initial authorization request is associated with the intermediary service based on the unique identifying information, and transmits at least part of the initial authorization request to the intermediary service. The intermediary service authenticates the request and retrieves stored customer information from a database based on the identifying information. The stored customer information includes an address of the customer's mobile device, a reference to one or more payment instruments associated with the customer, and a verification code associated with the customer's intermediary service account.

Using the retrieved address of the device, the intermediary service transmits a transaction notification message to the customer's mobile device. The transaction notification message may include the name or location of the point of purchase, the transaction amount, a listing of payment instruments that may be used to pay for the transaction, and/or other pertinent characteristics of the transaction. The transaction notification message may also specify a required response from the customer. The required response may vary depending on the requesting merchant, the type of transaction, the amount of the transaction, or other factor associated with the transaction (e.g., the type of goods or services being sold, an assessment of the likelihood of fraud, etc.). For example, a low-price transaction may require no response, a higher value transaction may require that the customer confirm the transaction, and a still higher value transaction may require that the customer confirm the transaction and provide a verification code in response to the transaction notification message. The transaction notification message is presented to the customer on the mobile device. The intermediary service may also support fallback methods for transmitting the transaction notification message to the customer in the event that the primary method of sending the message to the customer is not available.

If a response is required from the customer, the customer's response is received by the mobile device and transmitted to the intermediary service. The intermediary service continues processing of the initial authorization request based on the customer's response. If the customer fails to respond to the transaction notification message, rejects the transaction, or provides an incorrect verification code, the intermediary service sends a denial message to the acquirer and the transaction fails.

If the customer authorizes the transaction by confirming the transaction, or confirming the transaction and providing a correct verification code, the intermediary service transmits an information request to the issuing institution of a payment instrument that is to be used to complete the transaction. In response to the request, the issuing institution provides account information for the selected payment instrument. The intermediary service forwards the account information to the acquirer, which generates a modified authorization request based on the received account information. The acquirer then sends the modified request to the associated payment association in accordance with its standard practices. By providing the account information to generate the modified authorization request, the intermediary service allows a customer to easily select among multiple payment instruments while using a single token or identifier at the time of payment. In addition, the provided account information may include additional verification that enables the payment association to process the transaction with a lower fee.

In some embodiments, the intermediary service may maintain a record of a set of payment instruments that are available to each customer for purposes of a transaction. One or more payment instruments may be automatically selected for each transaction based on rules that are defined by the intermediary service, by the customer, or by the merchant. Alternatively, a customer may be allowed to select a payment instrument from a list of payment instruments that are provided in a transaction notification message that is transmitted by the service to the customer. The selected payment instrument or payment instruments determine the issuing institution or institutions to which the intermediary service sends the information request.

In some embodiments, a customer may provide the unique identifying information to an online merchant via a computer interface, such as via a checkout process implemented on a web site. The online merchant transmits the unique identifying information to an acquirer (i.e., a financial institution that provides a clearinghouse service for consolidating financial transactions) in an initial authorization request. The transaction is then processed by the intermediary service in a similar manner to transactions received from a brick-and-mortar merchant. Alternatively, the online merchant may bypass the acquirer by transmitting the information directly to the intermediary service. The transaction may then be processed by the intermediary service as discussed above, with the online merchant acting in the acquirer's role.

When sensitive account information is transmitted through the intermediary service from a financial institution to an acquirer, the account information may remain in an encrypted form that cannot be interpreted or used by the intermediary service. For example, the intermediary service may allow customers to request payment with a debit card that requires a PIN or other unique code. Rather than having the customer enter the PIN or unique code, the PIN or code is transmitted by a financial institution across the intermediary service in an encrypted manner such that it cannot be utilized by the service. Only the intended receiving party has the necessary information to decrypt and use the received PIN or code. In this manner, customers are able to utilize the intermediary service for transactions like debit purchases. Such transactions are normally not available in certain environments because of rules pertaining to the handling and processing of PINs.

Various embodiments of the invention will now be described. The following description provides specific details for a thorough understanding and an enabling description of these embodiments. One skilled in the art will understand, however, that the invention may be practiced without many of these details. Additionally, some well-known structures or functions may not be shown or described in detail, so as to avoid unnecessarily obscuring the relevant description of the various embodiments. The terminology used in the description presented below is intended to be interpreted in its broadest reasonable manner, even though it is being used in conjunction with a detailed description of certain specific embodiments of the invention.

FIG. 1 is a block diagram of a representative environment 100 in which various parties process financial transaction data according to prior art methods. In the prior art environment, a transaction is initiated in step 1 when a customer 102 tenders a credit or debit card 104 at a point of purchase associated with a merchant 106. As used herein, "point of purchase" refers to any point where a card is used to pay for a good or service. A point of purchase may include, for example, a store, a vending machine, an online retailer, a restaurant, a contractor, a provider of services, etc.

To obtain identifying information contained on a tendered card and initiate the transaction process, the customer 102 or the merchant 106 may swipe the card 104 through a card reader and, if required, enter a PIN or code. Alternatively, for a purchase made via a website, phone, or other network-accessible service, the customer 102 may provide a card number, associated name, and/or other identifying information to the merchant. The identifying information that is obtained from the card depends on the type of transaction and the available systems for reading the card. Standard credit and debit cards include several sets of information referred to as Track 1 and Track 2. The data on Track 1 is considered public, while the data on Track 2 is considered private and must be transmitted using special security protections dictated by the issuing bank or the payment association (e.g., Visa, Master-Card, etc.). However, transaction fees are lower if data from Track 2 is also provided. Because of the security restrictions and the lack of a reader that can read the tracks, data from Track 2 is generally not available for online, mail order, or telephone transactions (generally referred to as "card not present transactions").

After receiving identifying information, the merchant 106 in step 2 sends an authorization request to an acquirer 108. The authorization request includes transaction information such as the identifying information, point of purchase information (e.g., a merchant's name or identifier), and the transaction details (e.g., price, products, quantities, fees and taxes). The acquirer 108 is generally a separate financial institution that functions as a clearinghouse for many electronic transactions. The acquirer 108 in step 3 forwards the authorization request to a payment association 112, which forwards the request to an issuing institution 110 in step 4. The issuing institution 110 may be, for example, a bank or other institution that provided the credit or debit card.

After receiving the authorization request, the issuing institution 110 evaluates the request by verifying the identifying information and the transaction amount. The issuing institution 110 then authorizes the transaction in step 5 by transmitting an authorization message to the payment association 112, which forwards the message to the acquirer 108 in step 6. In step 7, the acquirer 108 forwards the authorization message to the point of purchase 106, which records the completed transaction. At a later time, the issuing institution 110 provides payment for the transaction by transmitting the funds in step 8 to the payment association 112, which forwards the payment to the acquirer 108 in step 9. In the final step, the acquirer forwards the funds to the point of purchase 106 in step 10.

Figure 2A:
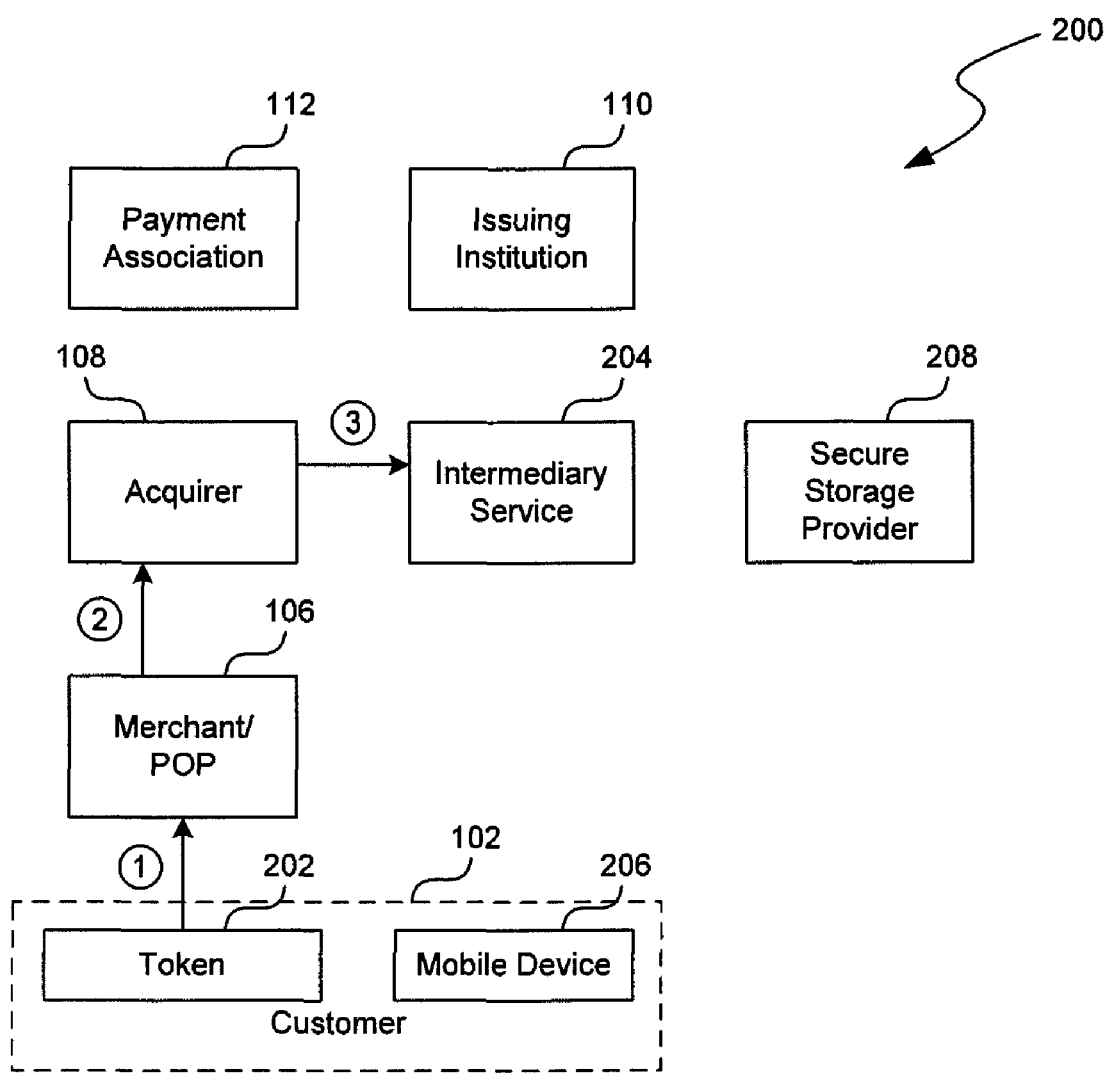
FIG. 2A is a block diagram that illustrates communication steps for sending an authorization request to an intermediary service.
Figure 2B:
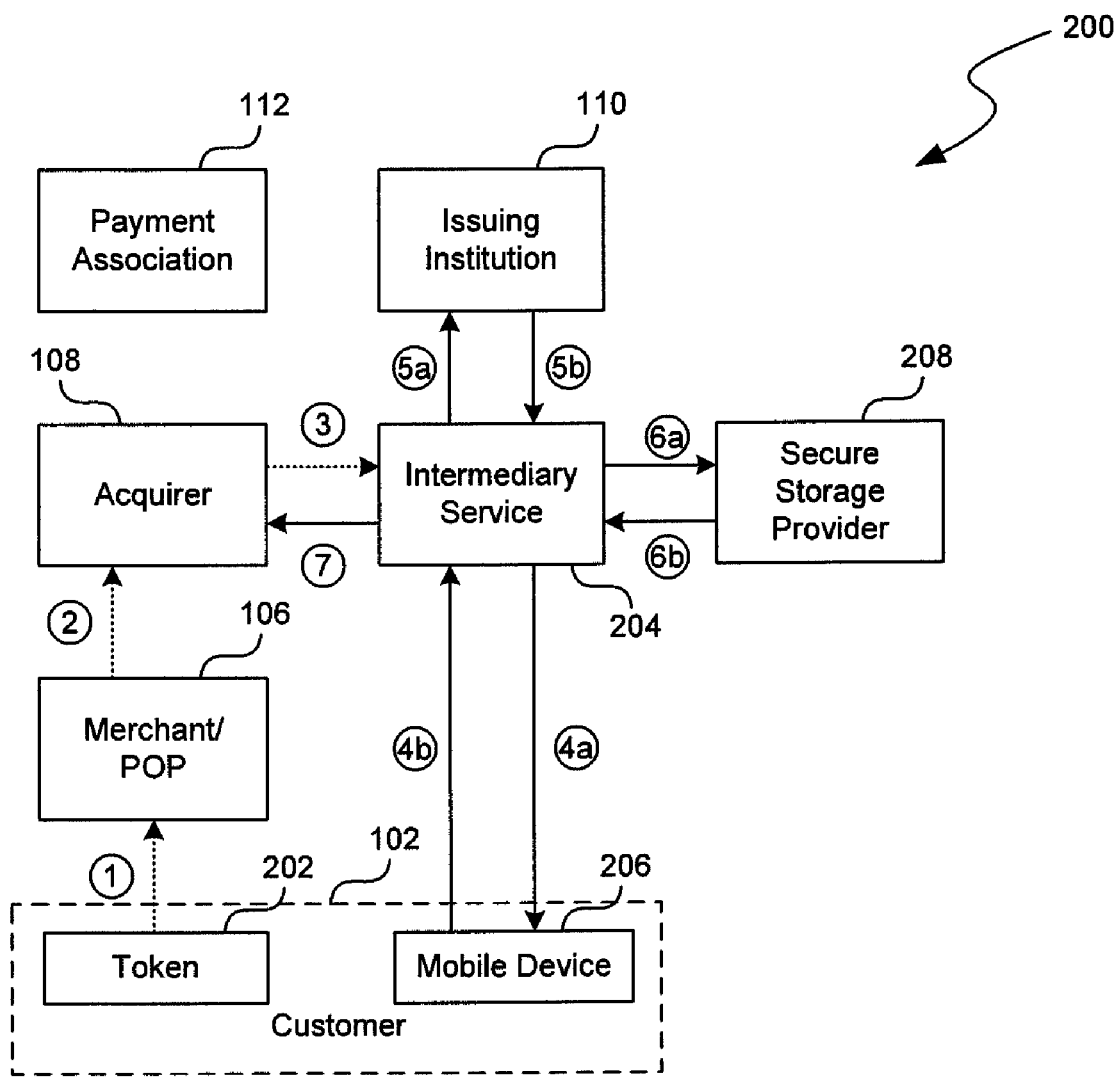
FIG. 2B is a block diagram that illustrates a two-step authorization process performed by the intermediary service.
Figure 2C:
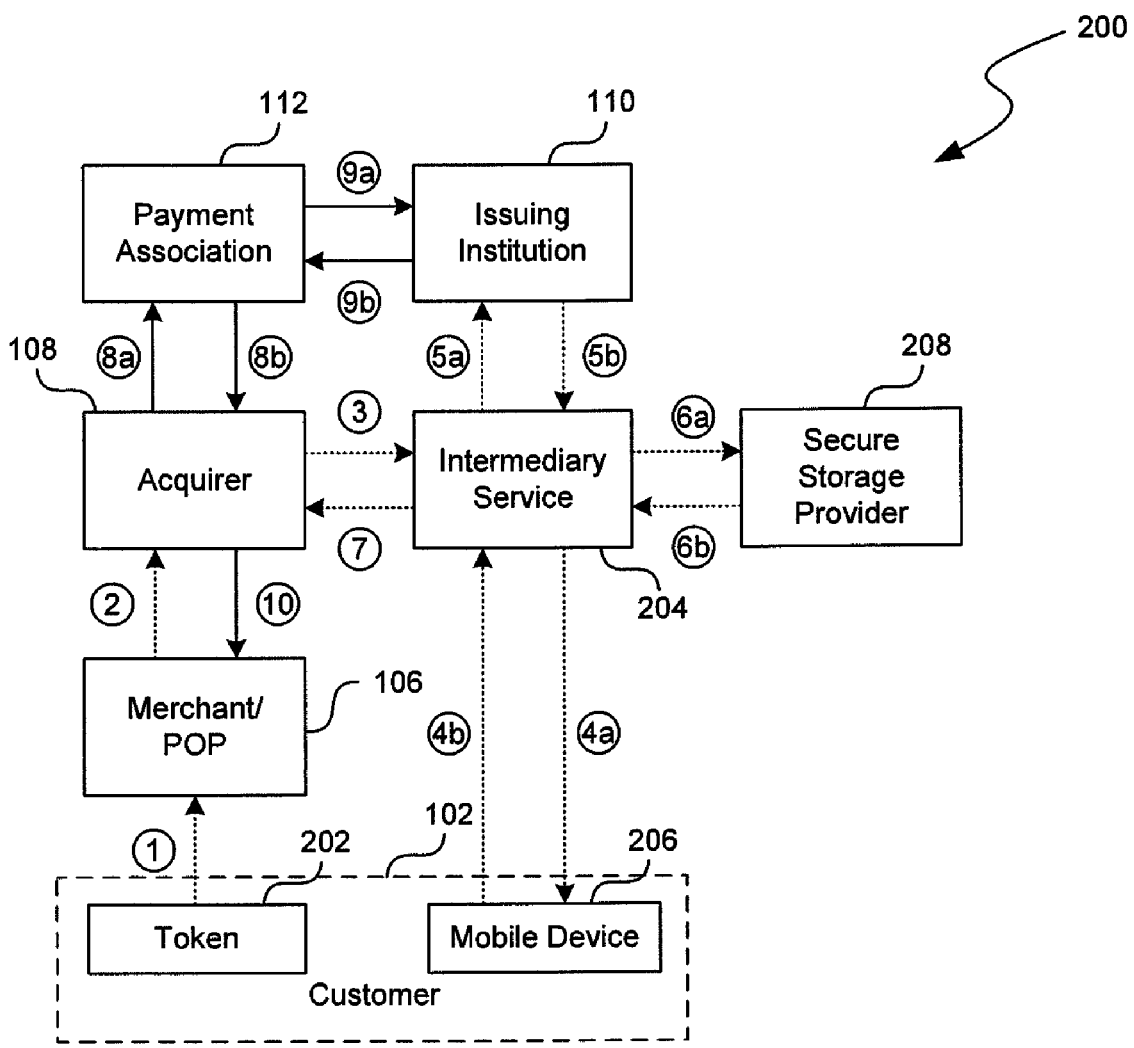
FIG. 2C is a block diagram that illustrates a process for authorizing a transaction using a modified authorization request.

FIGS. 2A, 2B, and 2C illustrate an environment 200 in which an intermediary service 204 operates and depicts the order in which various service and system modules involved in the transaction communicate in order to authorize and facilitate the completion of a specific transaction. FIG. 2A illustrates the communication steps for sending an initial authorization request to the intermediary service. A transaction begins in step 1 when a customer 102 uses a token 202 to provide unique identifying information to the merchant 106 at a point of purchase (POP) in order to make a purchase. As used herein, "token" is a generic term that refers to various means for providing the unique identifying information to the merchant 106. For example, a token may be a magnetic strip on a credit or debit card, a radio frequency identification (RFID) tag embedded in a card or mobile device, an optical pattern that is scanned by a scanner (e.g., a bar code) or similar or different technologies for conveying identifying information to the merchant. As discussed above, the identifying information may be provided at the point of purchase by swiping a card or by the customer 102 providing the information such as by typing identifying information using a keyboard (e.g., when purchasing at a website). The point of purchase may alternatively receive the information by detecting, through the use of a radio frequency identification (RFID) reader, an RFID token or other identification token associated with the card or with the customer's mobile device. The token 202 may be issued by the intermediary service 204 and is generally not associated with the customer's credit or debit cards. The unique identifying information may be an alpha-numeric code, a sixteen digit number similar to a credit card number, or one or more pieces of data that uniquely identifies the customer. The point of purchase 106 then generates the initial authorization request based on the received identifying information, point of purchase information, and transaction information and transmits the initial authorization request to the acquirer 108 in step 2. In some embodiments, the initial authorization request includes a unique transaction identifier. The transaction identifier may be retained throughout the authorization process such that every participant can use it to identify the transaction.

Rather than send the initial authorization request directly to the payment association 112, the acquirer 108 in step 3 sends at least part of the data from the initial authorization request to the intermediary service 204. The acquirer is able to route the initial authorization request to the intermediary service 204 because the identifying information transmitted in the authorization request identifies the initial authorization request as being associated with a customer 102 having an account with the intermediary service 204. After receiving the data from the initial authorization request from the acquirer 108, as will be discussed in additional detail herein, the intermediary service 204 authenticates the request to ensure that the request has been issued from a valid acquirer and the transaction is valid. Among other steps, the intermediary service 204 also retrieves customer information associated with the transaction. The customer information includes an address of a mobile device that is associated with the customer, one or more payment instruments (e.g., credit cards, debit cards, bank accounts, etc.) that are associated with the token 202, and a verification code that is associated with the customer, the token, or with a particular payment instrument. The customer information may also include any customer-defined rules on how such payment instruments are to be applied to the transaction.

FIG. 2B illustrates a two-step authorization process performed by the intermediary service. After authenticating the initial authorization request from the acquirer 108, at a step 4a the intermediary service 204 transmits a transaction notification message to a mobile device 206 that is associated with the customer. The mobile device may be a mobile phone, a smart phone, a media player (e.g., an Apple iPod, or iTouch), a mobile game device (e.g. a Nintendo GameBoy, a Sony PSP), a personal digital assistant (PDA), an email device (e.g., a Blackberry), or any other device that may send and receive wireless transmissions. The transaction notification message is transmitted to the mobile device via an XMPP message using the retrieved address of the mobile device. The XMPP message may be sent using a data channel, such as a data network implementing TCP/IP provided by a wireless service provider. The message may be sent to a standard TCP port, such as port 5222. The retrieved address may be, for example, a telephone number, network address, or e-mail address associated with the mobile device. The transaction notification message includes transaction information such as the amount, time, or location of the transaction. The transaction notification message may also request the customer 102 to provide information to continue the transaction, such as to provide a transaction confirmation, a customer-specific, token-specific, or payment instrument specific) verification code, and/or a selection of a payment instrument to use for the transaction.

In the event that the intermediary service 204 is unable to transmit the transaction notification message to the mobile device, the intermediary service may support fallback methods for transmitting a transaction notification message to the customer. For example, in the event that the intermediary service is unable to communicate with the mobile device using an XMPP-formatted message, the service may also send the transaction notification message to the device using a short message service (SMS) message, an email message, or through another messaging channel. In some embodiments, the intermediary service may call the mobile device (if the mobile device has voice capability) and may use an Interactive Voice Response (IVR) system to solicit the confirmation from the customers. If the mobile device cannot be reached via any channel, in some embodiments the intermediary service 204 transmits the transaction notification message to a different device capable of receiving data messages that is associated with the customer, such as a personal computer. Alternatively, the intermediary service may attempt to communicate with the user through a land-line telephone. The intermediary service may maintain a prioritized list of fallback methods to use, and may proceed through the list until the transaction notification message is delivered to the customer or until a certain period has elapsed and the service declares a delivery failure.

Figures 3C, 3D:
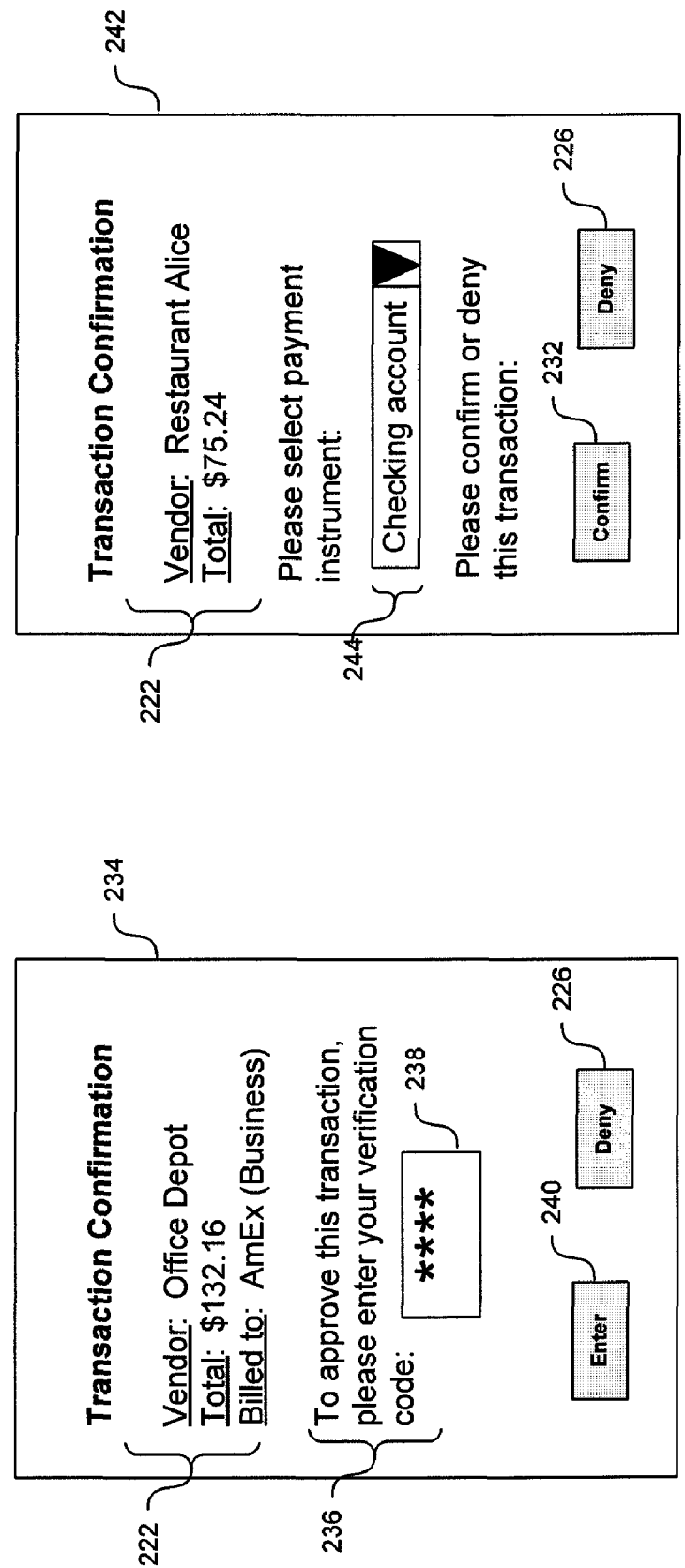

FIGS. 3A-3D are representative screenshots of a transaction notification message that may appear to a customer of a mobile device. Although the figures depict each example message separately, portions of the messages shown in FIGS. 3A-3D may in some cases be combined in a single message. FIG. 3A depicts a representative screenshot 220 associated with a first notification message. The notification message includes a region 222 that contains details of the financial transaction, such as a vendor (in the depicted example, a Barnes & Noble bookstore), a total amount being charged ($21.36), and a financial instrument that is being used to complete the transaction (a personal Visa card, automatically selected as a result of a service, customer, or merchant rule). For transactions under a first threshold, the service may not require a customer to confirm that the transaction should take place. In the depicted example, the notification message therefore includes a message 224 to the customer indicating that no response is required to approve the transaction. If, however, the customer is unaware of the transaction and therefore believes that the transaction may be a fraudulent one, the customer is presented with a "deny" button 226. By selecting the deny button, the customer is able to notify the intermediary service that the transaction is fraudulent or in error and thereby cause the intermediary service to terminate the transaction.

FIG. 3B depicts a representative screenshot 228 associated with a second notification message. The notification message includes a region 222 that contains details of the financial transaction, such as a vendor (in the depicted example, a restaurant), a total amount being charged ($75.24), and a financial instrument that is being used to complete the transaction (a debit card, automatically selected as a result of a service, customer, or merchant rule). For transactions between the first threshold and a second threshold, the service may require a customer to confirm that the transaction should take place. In the depicted example, the notification message therefore includes a message 230 to the customer indicating that the customer must confirm or deny the transaction. To confirm the transaction, the customer may select a "confirm" button 232. By selecting the confirm button, the customer is able to notify the intermediary service that the transaction should proceed. To deny the transaction, the customer selects the "deny" button 226. Selecting the deny button notifies the intermediary service that the transaction is fraudulent or in error and thereby cause the intermediary service to terminate the transaction.

FIG. 3C depicts a representative screenshot 234 associated with a third notification message. The notification message includes a region 222 that contains details of the financial transaction, such as a vendor (in the depicted example, Office Depot), a total amount being charged ($132.16), and a financial instrument that is being used to complete the transaction (a business American Express card, automatically selected as a result of a service, customer, or merchant rule). For transactions above the second threshold, the service may require a customer to confirm that the transaction should take place by entering the customer's verification code. In the depicted example, the notification message therefore includes a message 236 to the customer indicating that the customer must enter the verification code. A text entry box 238 is provided, which displays a default character (e.g., "*") as an additional security measure as the customer keys in their verification code. After entry of the code, the customer selects an "enter" button 240 to confirm the transaction. By selecting the enter button, the customer notifies the intermediary service that the transaction should proceed, provided that the verification code entered by the customer matches the verification code that is associated with the customer, the token, or the payment instrument and stored by the service. To deny the transaction, the customer selects the "deny" button 226. Selecting the deny button notifies the intermediary service that the transaction is fraudulent and thereby cause the intermediary service to terminate the transaction.

FIG. 3D depicts a representative screenshot 242 associated with a fourth notification message. The notification message includes a region 222 that contains details of the financial transaction, such as a vendor (in the depicted example, a restaurant) and a total amount being charged ($75.24). Rather than the display of an automatically-selected payment instrument that will be used as the financial instrument in the transaction, however, the fourth notification message includes a drop-down menu 244 that allows the customer to affirmatively select the desired payment instrument that the customer would like to use for the transaction. For example, the customer may select a direct transfer from a checking account (depicted), or any debit, credit, gift certificate, or other holder of value that is associated with the account of the customer at the intermediary service. Once the customer has selected the desired financial instrument to use in the transaction, the customer then confirms that the transaction should proceed by selecting the "confirm" button 232. By selecting the confirm button, the customer is able to notify the intermediary service that the transaction should proceed using the selected financial instrument. To deny the transaction, the customer selects the "deny" button 226. Selecting the deny button notifies the intermediary service that the transaction is fraudulent or in error and thereby cause the intermediary service to terminate the transaction.

Returning to FIG. 2B, when required by the transaction notification message (such as required by the transaction notification messages in FIGS. 3B-3D), the customer 102 uses the mobile device 206 to send a confirmation message. Such a confirmation message is sent in a step 4b, and may confirm the transaction or deny the transaction in the transaction notification message. If the customer denies the transaction, the intermediary service ends further processing of the first authorization request and notifies the acquirer 108 that the request has been denied. The acquirer, in turn, notifies the merchant who then cancels the transaction.

If, however, the customer confirms the transaction in the notification message from the mobile device 206, or if the notification message does not require a confirmation receipt from the customer (such as in the transaction notification message in FIG. 3A) the intermediary service 204 generates an information request, which is used to obtain account information for a selected payment instrument. As described below, the account information is used to complete the process of authorizing the transaction. The information request is based on the initial authorization request, the customer's verification message, and the stored customer information. The information request is to be sent to the appropriate issuing institution with sufficient information to allow the issuing institution to provide the correct account information in response to the request.

If the retrieved customer information only contains a single payment instrument, the information request is constructed and transmitted to the issuing institution associated with the single payment instrument. If, however, the retrieved customer information includes multiple payment instruments, the intermediary service 204 may automatically determine which payment instrument is to be used for the transaction. The determination may be based on default rules that are maintained by the service. For example, the service may require that all transactions below a certain dollar value be processed as a debit transaction, and all transactions above the certain dollar value be processed as a credit card transaction. The determination may be based on rules that are specified by the merchant associated with the transaction. For example, a merchant may only accept a certain type of charge card and the customer may be required to use the charge card that is accepted by the merchant. The determination may also be based on rules that are defined by the customer, such as the use of one payment instrument for charges at restaurants and the use of another payment instrument for charges everywhere else. The customer may define processing rules based on many different factors, such as the location of the purchase, the point of purchase, and the day or date of the purchase. As an example, a customer might specify that a business credit card should be used for transactions occurring during regular business hours on weekdays, while a personal credit card should be used for transactions occurring on a weekend or after normal business hours on a weekday. In some circumstances, such as depicted in FIG. 3D, the transaction notification message that is transmitted to the customer contains a menu that allows the customer to select which payment instrument that they would like to use for the transaction. If such a selection is made by the customer, the intermediary service uses the selected payment instrument.

The intermediary service 204 transmits the information request to an issuing institution 110 associated with the selected payment instrument. If the intermediary service is integrated with the issuing institution, the request may be directly sent to the issuing institution 110 in step 5a. The issuing institution 110 responds to the information request by providing account information associated with the selected payment instrument. In some embodiments, the account information is encrypted such that the information can be decrypted by the acquirer 108 but not by the intermediary service 204. This provides additional security by reducing the number of entities that have access to the account information. However, in other embodiments, the intermediary service 204 decrypts the account information after receiving it from the issuing institution and provides the account information to the acquirer using its own encryption key. Because the account information is obtained directly from the issuing institution, it may also include Track 2 information for the payment instrument, which increases the security and reduces the cost of the transaction.

After obtaining the account information from the issuing institution 110, the intermediary service 204 in step 7 sends the account information to the acquirer 108. As discussed below, the acquirer 108 then generates a modified authorization request based on the initial authorization request and the received account information associated with the selected payment instrument. In some embodiments, this is done by replacing the identifying information in the initial authorization request with the account information.

In those cases in which the intermediary service 204 does not have a direct relationship with the issuing institution 110 of the selected payment instrument, however, the intermediary service may obtain the necessary account information from a secure storage provider 208. The secure storage provider 208 is a data storage service that stores account information for payment instruments in a similar fashion to the issuing institution to enable the intermediary service to proceed with the transaction. The account information may be provided to the secure storage provider 208 at any time prior to the transaction, such as when the customer initially registers with the intermediary service. At a step 6a, a request is made to the secure storage provider 208 for account information associated with the customer's selected payment instrument. At a step 6b, the secure storage provider responds with the account information. The intermediary service 204 then provides the account information to the acquirer 108, which generates the modified authentication request as if the information had been obtained from the issuing institution 110.

FIG. 2C illustrates a process for authorizing a transaction using a modified authorization request. As shown in FIG. 2C, the process is executed in a similar manner to the process in FIG. 1. Thus, in step 8a, the acquirer sends the modified authorization request to the payment association 112, which in step 9a sends the request to the issuing institution 110 associated with the selected payment instrument. The issuing institution 110 authorizes the transaction based on the information in the modified authorization request (i.e., the account information provided through the intermediary service 204). In step 9b, the issuing institution 110 transmits an authorization message to the payment association 112, which forwards the authorization message to the acquirer 108 in step 8b. In step 10, the acquirer 108 transmits the authorization message to the point of purchase 106, which records the transaction. The payment process may then be carried out using the method discussed above. In some embodiments, the acquirer 108 also sends a copy of the authorization message or other transaction information (e.g., items purchased) to the intermediary service 204. The intermediary service 204 may then send a receipt message to the mobile device 206 to indicate that the transaction was authorized.

Figure 4:
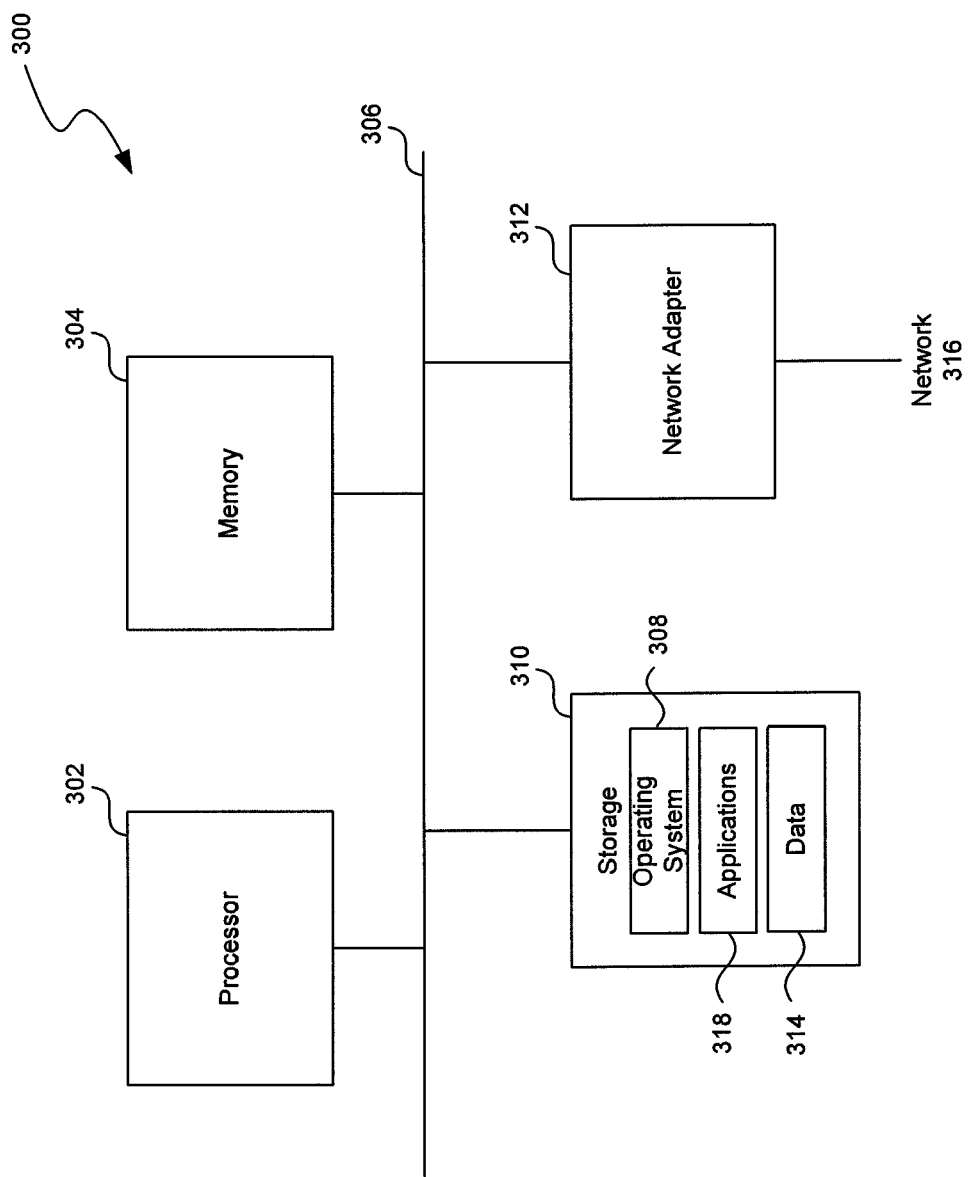
FIG. 4 is a block diagram of a representative server architecture.

FIG. 4 is a high-level block diagram showing an example of the architecture of a server 300. One or more servers 300 may be utilized by, for example, the intermediary service 204 or the acquirer 108 to implement the transaction processing depicted in FIGS. 2A-2C. The server 300 includes one or more processors 302 and memory 304 coupled to an interconnect 306. The interconnect 306 shown in FIG. 4 is an abstraction that represents any one or more separate physical buses, point-to-point connections, or both connected by appropriate bridges, adapters, or controllers. The interconnect 306, therefore, may include, for example, a system bus, a Peripheral Component Interconnect (PCI) family bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, sometimes referred to as "Firewire".

The processor(s) 302 may include central processing units (CPUs) of the server 300 and, thus, control the overall operation of the server 300 by executing software or firmware. The processor(s) 302 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices. The memory 304 represents any form of random access memory (RAM), read-only memory (ROM), flash memory, or the like, or a combination of such devices.

The software or firmware executed by the processor(s) may be stored in a storage area 310 and/or in memory 304, and typically includes an operating system 308 as well as one or more applications 318. Data 314 utilized by the software or operating system is also stored in the storage area or memory. A network adapter 312 is connected to the processor(s) 302 through the interconnect 306. The network adapter 312 provides the server 300 with the ability to communicate with remote devices, such as clients, over a network 316 and may be, for example, an Ethernet adapter.

Figure 5:
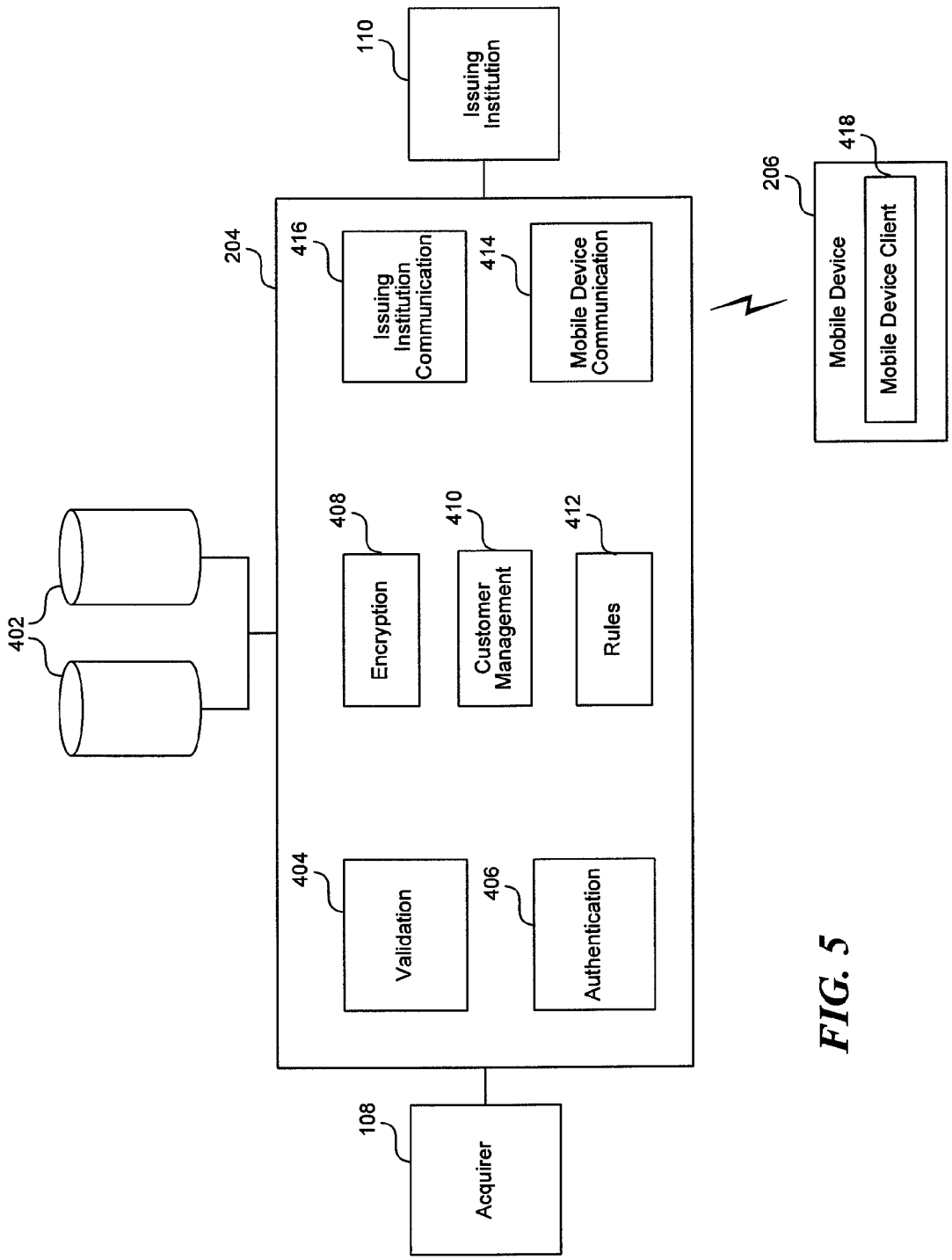
FIG. 5 is a logical block diagram of the intermediary service.

FIG. 5 illustrates a logical block diagram of the intermediary service 204. As discussed above, the intermediary service 204 receives an initial authorization request from the acquirer 108 and executes additional steps to notify the customer of the transaction and receive the customer's verification of the transaction. The intermediary service 204 also requests account information from the issuing institution 110 and provides the account information to the acquirer 108. Aspects of the service may be implemented as special purpose hard-wired circuitry, programmable circuitry, or as a combination of these. As will be described in additional detail herein, the intermediary service 204 includes a number of modules to implement the functions of the service. The modules and their underlying code and/or data may be implemented in a single physical device or distributed over multiple physical devices and the functionality implemented by calls to remote services. Assuming a programmable implementation, the code to support the functionality of the service may be stored on a computer readable medium such as an optical drive, flash memory, or a hard drive. One skilled in the art will appreciate that at least some of the individual modules may be implemented using application-specific integrated circuits (ASICs), programmable logic, or a general-purpose processor configured with software and/or firmware.

As previously described, the intermediary service 204 receives an initial authorization request from the acquirer 108 and transmits an information request to the issuing institution 110. The intermediary service 204 receives account information in response to the information request and provides the received account information to the acquirer 108. The intermediary service 204 also communicates with a mobile device 206 to notify the customer of a requested transaction and receive the customer's verification of the transaction. The intermediary service 204 also interacts with a storage component 402, which is configured to store configuration information and customer information. In particular, the storage component 402 stores data linking the identifying information received from the acquirer 104 to customer-specific information, such as the address of the mobile device 206, one or more payment instruments associated with the customer, and a verification code or codes associated with the customer, the token, or the payment instruments.

The intermediary service 204 includes various modules to assist in processing authorization requests. In particular, the intermediary service 204 includes a validation module 404, which is configured to receive initial authorization requests and validate that the requests are correctly formed. Validating initial authorization requests may include, for example, verifying that the request is correctly structured and includes all of the required data fields. In some embodiments, the authorization request is specified in extensible markup language (XML). In these embodiments, validation includes determining that the XML is well-formed.

The intermediary service 204 also includes an authentication module 406, which is configured to authenticate the sender of the authorization request. Authentication is used to avoid having an imposter pose as a legitimate acquirer for the purpose of submitting fraudulent requests for payment. The authentication module 406 may authenticate the acquirer using methods well known in the art. For example, the authentication module 406 may be configured to verify a digital signature associated with the acquirer and contained in an initial authorization request or in an authentication exchange completed prior to receiving an initial authorization request. Alternatively, the authentication module 406 may be configured to authenticate the acquirer by using a shared encryption key to decrypt a portion of the data in the authorization request. To do so, the authentication module 406 interacts with an encryption module 408, which is configured to execute an encryption algorithm that is complementary to an encryption algorithm that is used by the acquirer 108. The encryption module 408 is also used to encrypt messages sent from the intermediary service 204 to mobile devices 206, issuing institutions 110, and the data storage service 208. In some embodiments, the encryption module also decrypts messages received from the issuing institution and encrypts messages sent to the acquirer 108.

The intermediary service 204 includes a customer management module 410, which is configured to retrieve customer information associated with the initial authorization request. The customer information is accessed from the storage component 402 based on the identifying information contained in the initial authorization request. As discussed above, the identifying information may be an alpha-numeric code, a sixteen digit number similar to a credit card number, or one or more pieces of data that uniquely identifies the customer (e.g., a customer nickname). The stored customer information include an address of a mobile device associated with the customer, information defining one or more payment instruments that may be utilized by the customer to complete a purchase transaction, and a verification code or codes that are associated with the customer, the token, or the payment instruments. If multiple payments instruments are defined, the customer information may also specify a default payment instrument or a set of parameters for determining which payment instrument should be used for a particular transaction.

After the customer management module 410 retrieves the stored customer information, a rules module 412 determines the service's response to the initial authorization request. In particular, the rules module 412 is configured to determine the type of notification to provide to the customer's mobile device and the required level of customer response to the notification in order to confirm the transaction. The rules module 412 may also determine a selected payment instrument to use in the transaction. The type of notification may vary depending on the type and amount of the transaction. For example, the service may require different responses from the customer depending on the total value of the purchase. At a first level (e.g., less than $25), the service may be configured to send a transaction notification to the mobile device without requiring any response from the customer. At a second level (e.g., between $25 and $100), the service may require that the customer reply to the transaction notification with a response that either authorizes or rejects the transaction. At a third level (e.g., above $100), the service may require that the customer reply to the transaction notification with a response that either authorizes or rejects the transaction, as well as provide a verification code with the response. Such rules may be defined by the operator of the service, by merchants that interact with the service, or by customers that use the service. While three levels are provided as an example, it will be appreciated that a greater or lesser number of levels may be utilized by the service. If existing service-, merchant-, or customer-defined rules do not already specify the payment instrument to use in the transaction, the rules module 412 will also require that the customer select a payment instrument to use for the transaction in the response. In some embodiments, the rules module 412 includes merchant-defined rules specifying that certain payment instruments are or are not accepted by a particular merchant. For example, a particular merchant may specify a rule indicating that it will not accept payment using American Express and will accept payment using the merchant's gift cards. The rules module 412 can then use this information in selecting the payment instrument or in limiting the number of payment instruments from which a customer can select for a transaction.

The intermediary service 204 also includes a mobile device communication module 414, which is configured to communicate with mobile devices 206. The mobile device communication module 414 generates and transmits a transaction notification message in response to the initial authorization request. The transaction notification message includes transaction information, such as the amount of the transaction and the name or location of the merchant requesting the authorization. The transaction notification message may also specify a payment instrument to use for the transaction or specify a list of payment instruments and request a selection from the list. The transaction notification may be sent to the mobile device in a variety of messaging formats. In some embodiments, the transaction notification is transmitted to mobile devices 206 via an asynchronous XMPP message. To allow a mobile device to receive an XMPP-encoded message, the mobile device includes a mobile device client 418 that runs in the background of the device. The mobile device client 418 may be pre-installed on the mobile device 206, or may be downloaded to the mobile device 206 when a customer opens an account with the intermediary service. In some embodiments, the mobile device client 418 operates continuously, since it is impossible to predict when a customer might attempt to make a purchase. In these embodiments, the mobile device 206 remains in a state where it always can receive a transaction notification message. However, the mobile device 206 will often operate in a standby or low-power mode in order to preserve battery power. In these embodiments, the mobile device client 418 cannot be operated continuously. Instead, the intermediary service 204 sends a wake-up message to the mobile device client 418 before sending a transaction notification message. The wake-up message may be transmitted on a different messaging channel, such as via a binary SMS message or via a WAP push message or other remote push service.

Once the service has determined that the transaction has been confirmed by the customer, an issuing institution communication module 416 generates an information request based on the received initial authorization request, the customer information, and the information received from the mobile device 206 (if any). In particular, the information request may include the desired payment instrument information, the transaction amount, transaction items, and information about the point of purchase. The issuing institution communication module 414 encrypts the request using the encryption module 408 and transmits the message to the issuing institution 112 where the information request is processed.

After the information request is processed by the issuing institution 112, the issuing institution communication module 414 receives an account information message from the issuing institution that includes account information associated with the selected payment instrument. The account information may include, for example, the credit card number and expiration date of a credit card selected from the set of available payment instruments. After receiving the account information, the intermediary service 204 forwards the information to the acquirer 106. In some embodiments, the account information is encrypted by the issuing institution 112 such that it can only be decrypted by the acquirer 106 (i.e., the account information cannot be interpreted by the intermediary service 204). Alternatively, the account information may be decrypted by the intermediary service 204 and re-encrypted for transmission to the acquirer 106. The acquirer 106 then proceeds according to the process discussed above in FIGS. 2A-C.

As previously stated, the acquirer 108 may also send information from the authorization message and/or other transaction information to the intermediary service 204. The mobile device communication module 416 then generates a receipt message and transmits the receipt message to the mobile device 206 using the methods discussed above. In some embodiments, the mobile device client 418 provides a "dispute" button that may be selected by the customer to indicate that the transaction was erroneous or fraudulent such that the issuing institution 110 should initiate dispute proceedings.

Figure 6A:
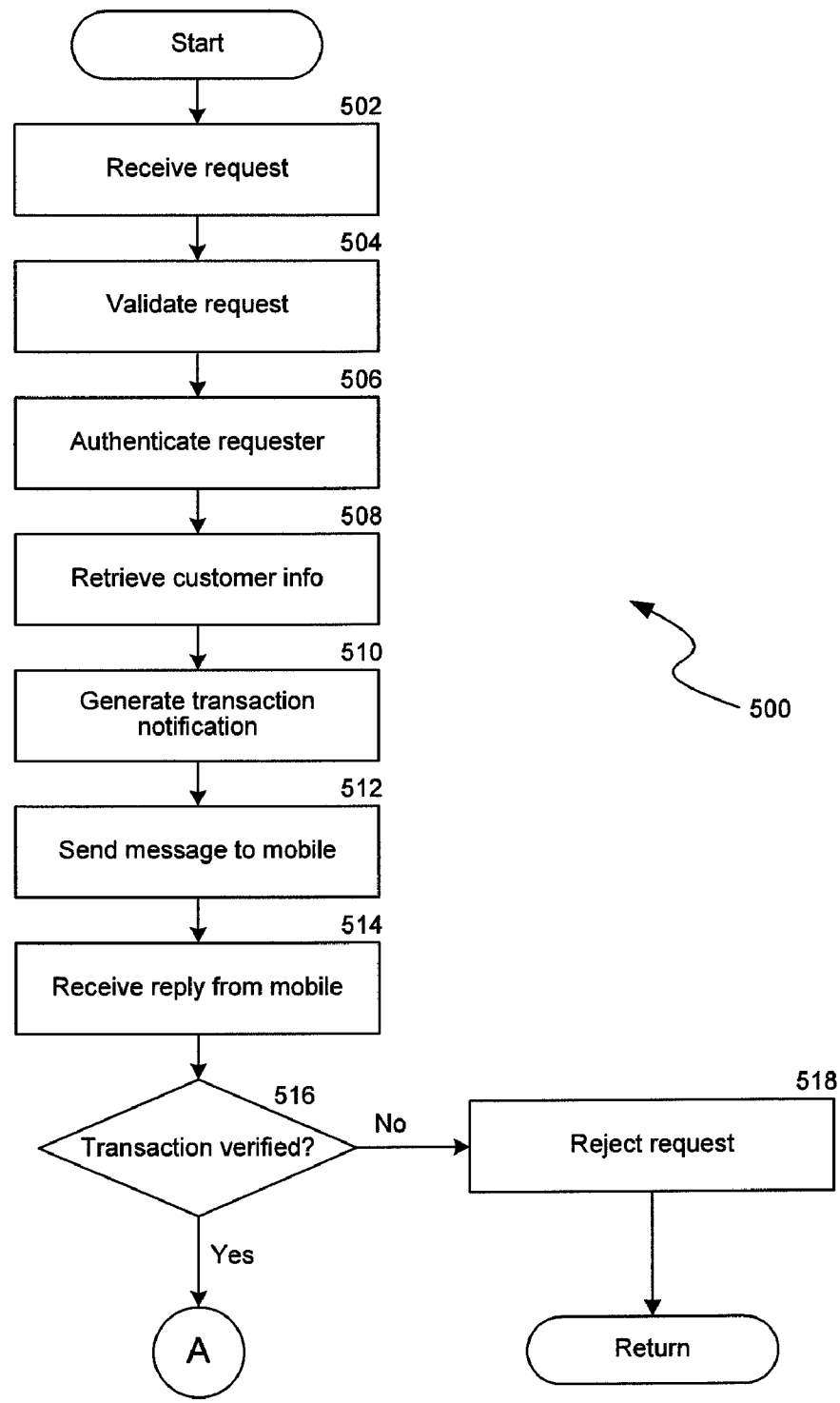
FIGS. 6A and 6B are a flow chart of a process for processing financial transaction data executed by an intermediary service.
Figure 6B:
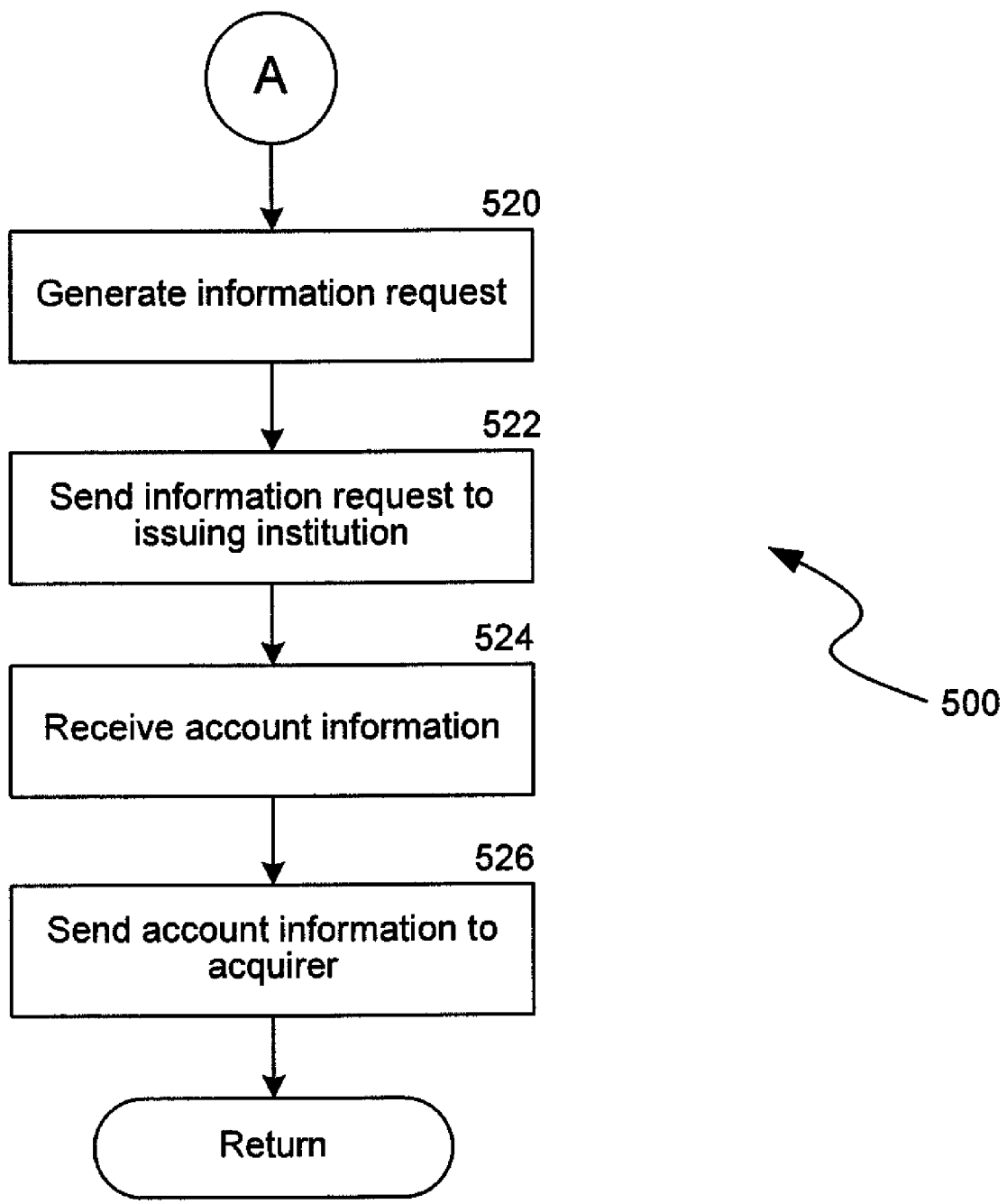

FIGS. 6A and 6B illustrate a flowchart of a process 500 for processing financial transaction data executed by the intermediary service 204. Processing begins in block 502, where the intermediary service 204 receives an initial authorization request from an acquirer 106. As discussed above, the initial authorization request includes unique identifying information, transaction information (e.g., the amount of the transaction, the transaction identifier, etc.), and point of purchase information. After receiving an initial authorization request, processing proceeds to block 504, where the service validates the request according to the methods discussed above. The validation step may include, for example, verifying that the message is in a proper format and verifying that the message includes the essential data for handling the request. Processing then proceeds to block 506, where the service authenticates the requester. As discussed above, the authorization request may include a digital signature provided by the acquirer that can be cryptographically verified. Alternatively, the service may authenticate the acquirer by using a shared cryptographic key to decrypt a portion of the data in the message.

The service then proceeds to block 508, where it retrieves customer information corresponding to the information in the authorization request. Retrieving customer information may be executed by using some or all of the identifying information in the request as an index into a customer information database. As discussed above, the stored customer information may include information defining one or more payment instruments that the customer has indicated can be used to pay for a transaction. The customer information also includes an address of a mobile device, such as the mobile device's telephone number or IP address. The customer information is provided by a customer during an initial registration process in which the customer registers with the service and enters the appropriate information. Alternatively, the customer information may be provided by, for example, a financial institution that offers the intermediary service as an added benefit to a financial instrument provided to the customer.

After retrieving the stored customer information, processing proceeds to block 510, where the service generates a transaction notification message. The transaction notification message includes at least a minimum amount of information to enable the customer to confirm the transaction. Thus, the transaction notification message may include the transaction time, the transaction amount, the point of purchase, and/or the purchase location. The transaction notification message may also specify a payment instrument that will be used for the transaction, or a list of payment instruments that may be used and require that the customer select from the list. In addition, the transaction notification message specifies a required response from the customer, such as an authorization/denial of the transaction or the submission of a verification code.

After generating the transaction notification message, the service proceeds to block 512, where it sends the message to the mobile device 206. Processing then proceeds to block 514, where the service receives a reply from the mobile device 206. As discussed above, this step is not executed if the transaction notification message did not require a response from the customer. The service then proceeds to decision block 516, where it uses the reply message to determine whether the transaction was verified by the customer. In some cases, the service may do so by detecting a verification indicator in the reply message, which could simply be a single bit or a "yes" or "no" received from the mobile device 206. Alternatively, if the reply message includes a verification code, the service compares the received verification code to a verification code in the stored customer information. In some embodiments, the verification code is encrypted by the mobile device 206 using a one-way hash function. The intermediary service then verifies the transaction by comparing the received hash value to a value generated by applying the same one-way hash function to the stored verification code. If the reply message indicates that the customer has denied the request or the customer's verification code does not match the stored verification code, processing proceeds to block 518, where the service rejects the authorization request. At this step, the service may transmit a rejection message to the acquirer to notify it of the rejected request.

If the transaction is verified by the customer, processing proceeds to block 520 in FIG. 6B, where the service generates an information request using information from the initial authorization request, the customer information, and/or the customer's reply message. The information request may include identifying information from the initial authorization request or the customer information. After generating the information request in block 520, processing proceeds to block 522, where the service sends the message to the appropriate issuing institution.

Processing then proceeds to block 524, where the service receives an account information message from the issuing institution in response to the information request. As discussed above, the account information includes information associated with the selected payment instrument that can be used to authorize payment. The account information may be encrypted such that it can only be accessed by the acquirer 108. After receiving the account information, processing proceeds to block 526, where the intermediary service sends the account information to the acquirer 108, which can then generate the modified authorization request.

Figure 7:
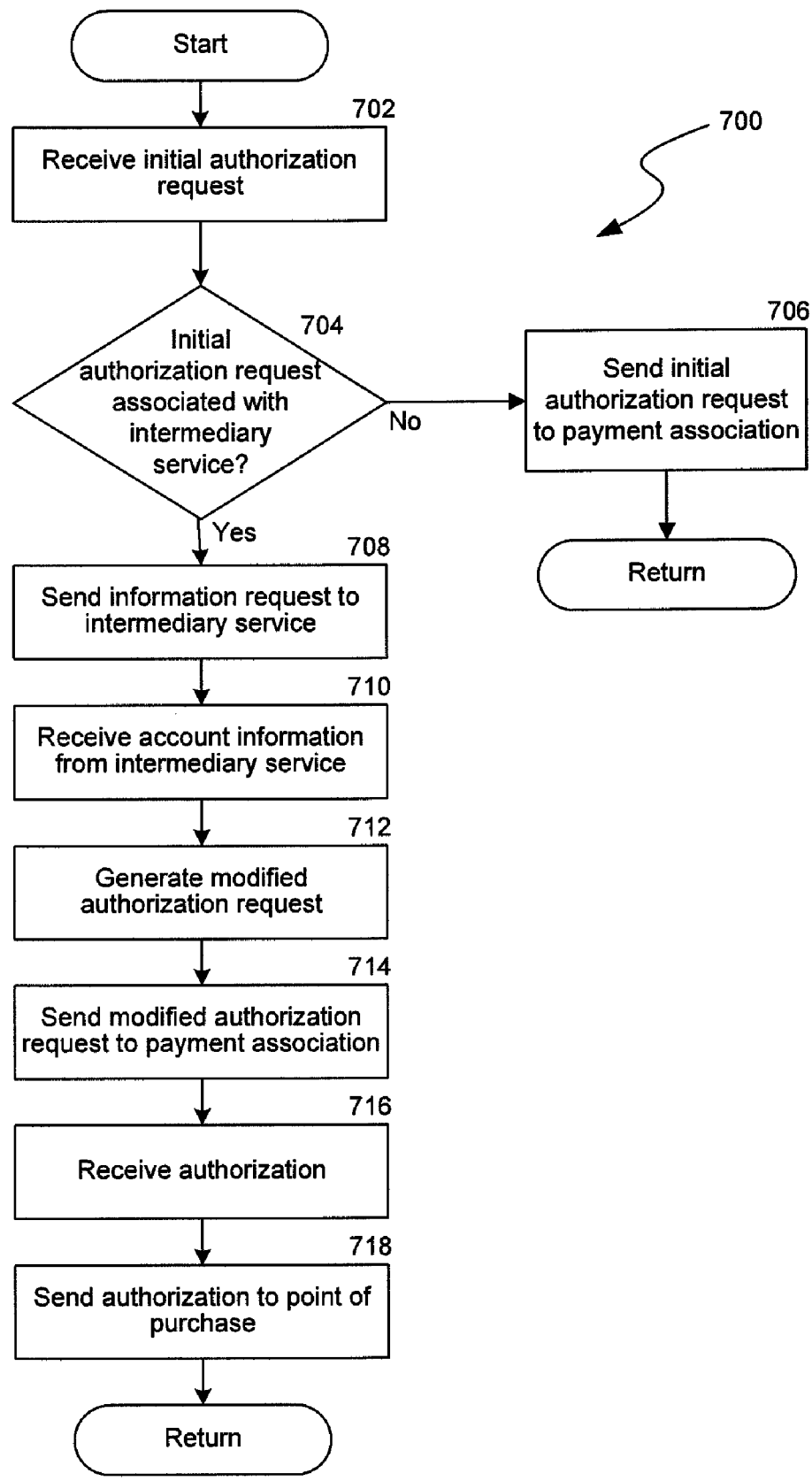
FIG. 7 is a flowchart of a process for processing financial transaction data executed by an acquirer.

FIG. 7 is a flowchart of a process 700 for processing financial transaction data executed by an acquirer 108. The process 700 is executed by the acquirer 108 in conjunction with the process 500 executed by the intermediary service of FIGS. 6A and 6B. Processing begins at block 702, where the acquirer 108 receives an initial authorization request from the point of purchase 106. At a decision block 704, the acquirer determines whether the initial authorization request should be routed to the intermediary service 204 based on the identifying information contained in the initial authorization request. The determination may include, for example, assessing whether an identifying number contained in the initial authorization request falls within a range of identifying numbers or has a particular prefix associated with the intermediary service 204. If the initial authorization request is not associated with the intermediary service, at a block 706 the acquirer forwards the initial authorization request to the payment association 112 for processing in accordance with traditional processes as described in FIG. 1. If, however, the identifying information contained in the initial authorization request indicates that the initial authorization request is associated with the intermediary service, processing continues to block 708. At block 708, the acquirer 108 sends at least part of the data from the initial authorization request to the intermediary service 204.

Processing then proceeds to block 710, where the acquirer 108 receives account information from the intermediary service 204. The intermediary service 204 determines the account information using the process 500 of FIGS. 6A and 6B. The received account information may be received in encrypted or unencrypted form. If encrypted by the issuing institution or the intermediary service, the acquirer 108 may decrypt the account information using a locally-stored encryption key. After receiving the account information, processing proceeds to block 712, where the acquirer 108 generates a modified authorization request based on the initial authorization request and the received account information. As discussed above, the acquirer 108 may generate the modified authorization request by replacing identifying information contained in the original request with the received account information. The following is an example of an initial authorization request such as might be received from a point of purchase:

Transaction Identifier
Identifying Information
Initial Track 2 Data (optional)
Industry Standard Code
Merchant Information
Transaction Amount
Transaction Items The identifying information results in the initial authorization request being sent to the intermediary service 204. After sending the initial authorization request to the intermediary service 204, the acquirer may receive the following account information in response:

Transaction Identifier
Real Account Information

The acquirer 108 would then construct the following modified authorization request:

Transaction Identifier
Real Account Information

-continued

Real Track 2 Data (optional)
Industry Standard Code
Merchant Information
Transaction Amount
Transaction Items For record-keeping purposes, and in order to ensure that authorization requests are correctly associated with received account information, a transaction identifier may be assigned to each transaction and used by the acquirer and the intermediary server to ensure that all sent and received messages are correctly correlated. The acquirer may store all initial authorization requests, received account information, and modified authorization requests in a data structure so that the acquirer or a third party may subsequently audit the information and confirm that transactions are being appropriately processed.

After the modified authorization request is generated, processing then proceeds to block 714 where the acquirer 108 sends the modified authorization request to the payment association 112. In block 716, the acquirer 108 receives an authorization or a denial in response to the modified authorization request. The acquirer 108 then completes the authorization process by sending the authorization or denial message to the point of purchase 106 in block 718. As discussed above, the acquirer 108 may also send the authorization or denial message to the intermediary service 204 so that the intermediary service 204 can send a receipt message to the customer's mobile device 206. The acquirer 108 may also send transaction details, such as the list of transaction items, to the intermediary service 204 so that the receipt message can include additional transaction details.

While the process 700 has been described as being implemented by the acquirer 108, it will be appreciated that process 700 can be implemented by any party that participates in the transaction approval process. For example, the payment association 112 or an issuing institution 110 may forward initial authorization requests to the intermediary service 204 in lieu of the acquirer forwarding the request. The account information is then returned to the payment association or issuing institution for further processing.

Figure 8:
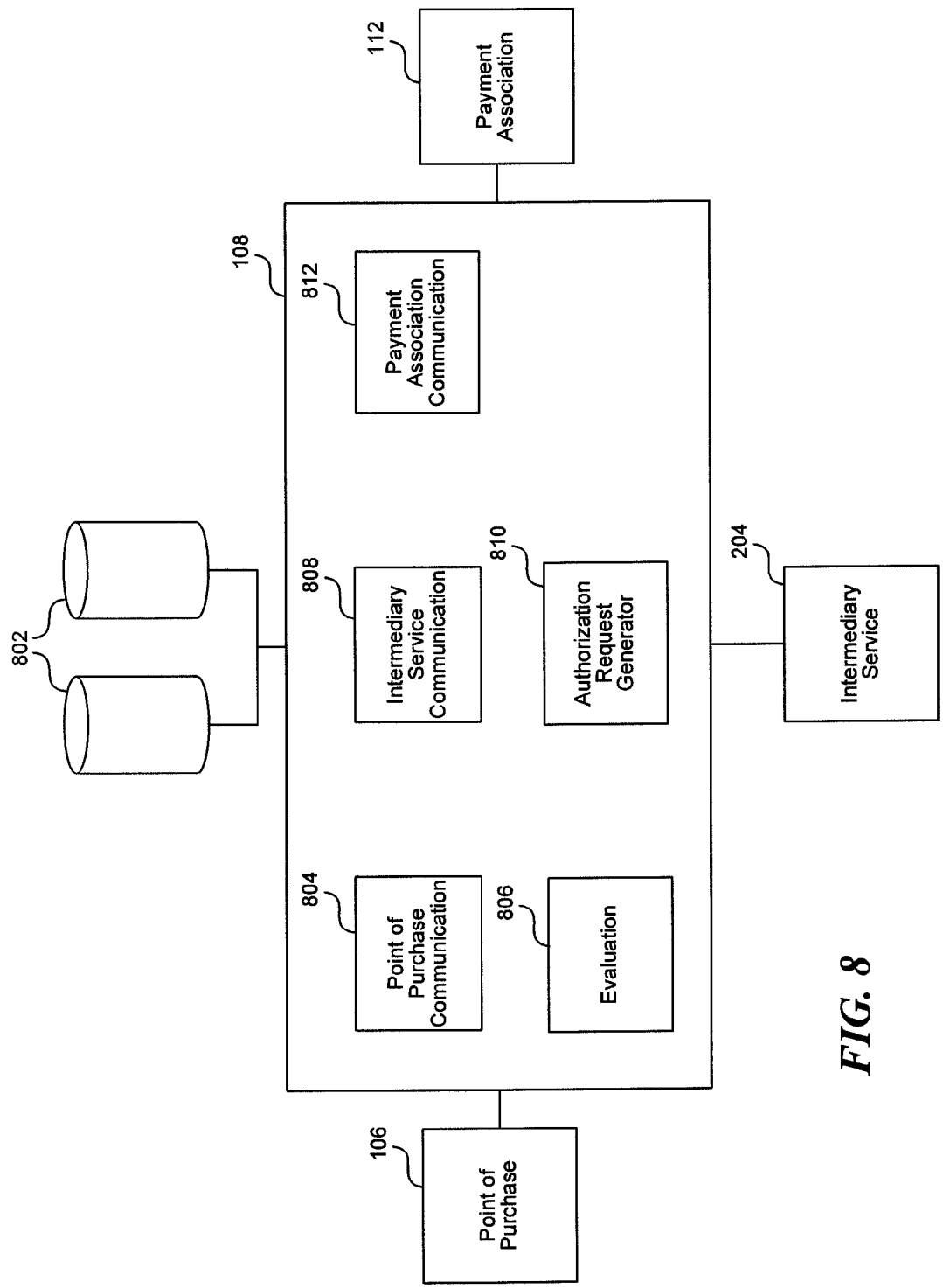
FIG. 8 is a logical block diagram of the acquirer.
Figure 9:
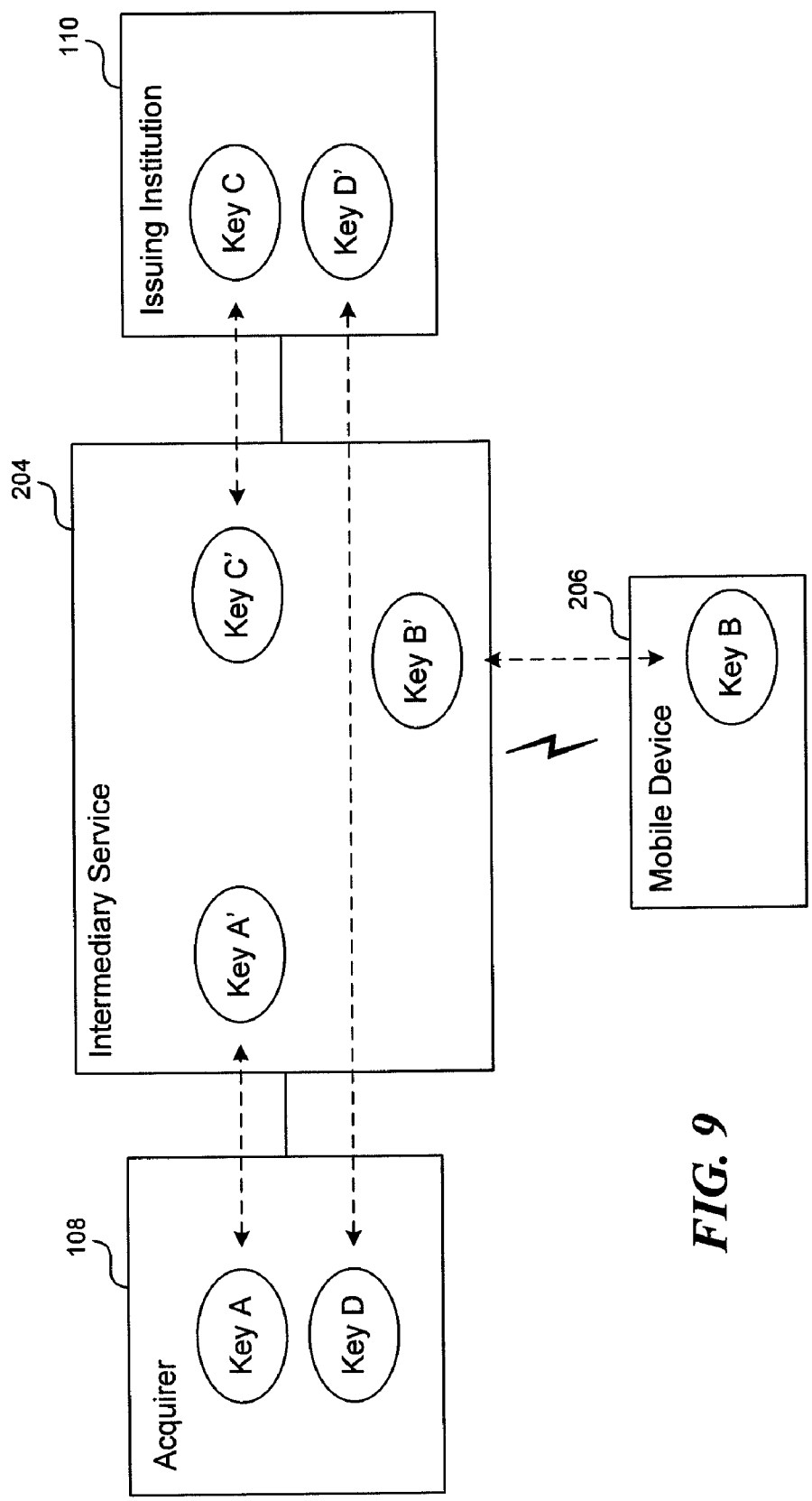
FIG. 9 is a block diagram of encrypted message routing through the intermediary service.

FIG. 8 illustrates a logical block diagram of the acquirer 108 that implements the process 700 of FIG. 7. The acquirer 108 redirects certain authorization requests to the intermediary service 204 and generates modified authorization requests based on information provided by the intermediary service 204. As with the intermediary service 204 shown in FIG. 5, aspects of the acquirer 108 may be implemented as special-purpose circuitry, programmable circuitry, or as a combination of these. The modules in the acquirer 108 may be implemented in a single physical device or distributed over multiple physical devices and the functionality implemented by calls to remote services.

As discussed above, the acquirer 108 receives an initial transaction authorization request from the point of purchase 106 and transmits a modified authorization request to the issuing institution 110 via the payment association 112. The acquirer 108 also communicates with the intermediary service 204 to request account information associated with a particular authorization request and to receive the requested account information. The acquirer 108 also interacts with a storage component 802, which is configured to store information used to integrate with the intermediary service 204. In particular, the storage component 802 stores identifying information (such as ranges of account numbers or account number prefixes) that can be used to determine which authorization requests should be handled by the intermediary service 204. The storage component 802 may also store historical transaction information to be used for auditing or if a transaction is disputed.

The acquirer 108 includes various modules to assist in processing authorization requests. In particular, the acquirer 108 includes a point of purchase communication module 804, which is configured to communicate with the point of purchase 106 to receive initial authorization requests and transmit authorization or denial messages at the end of the transaction. The acquirer 108 also includes an evaluation module 806, which is configured to evaluate initial authorization requests according to the process 700 described above to determine if initial authorization requests should be sent to the intermediary service 204.

The acquirer 108 also includes an intermediary service communication module 808, which is configured to communicate with the intermediary service 204 to send authorization requests and to receive account information. The intermediary service communication module 808 then provides the account information to an authorization request generator module 810, which is configured to generate a modified authorization request based on the initial authorization request and the received account information. The modified authorization request is then provided to a payment association communication module 812, which is configured to communicate with the payment association 112 to send the modified authorization requests to the issuing institution 110. After the issuing institution 110 approves or denies a transaction, the payment association communication module 812 also receives an authorization or denial message from the payment association 112. The acquirer 108 then forwards the message to the point of purchase 106 and/or the intermediary service 204.

One of the advantages of the disclosed intermediary service 204 is that it allows routing of encrypted messages through the service without revealing sensitive information that is contained in the messages to the operator of the service. FIG. 8 is a block diagram depicting various message routing paths through the intermediary service 204. Complementary encryption keys are depicted as being maintained by different parties that participate in the processing of a financial transaction. For example, a key A that is maintained by acquirer 108 allows the acquirer to encrypt messages and communicate in a secure fashion with the intermediary service 204, which maintains a complementary key A' for decoding the encrypted messages. Similarly the intermediary service 204 maintains a key B' that allows it to communicate in a secure fashion with the mobile device 206, which maintains a complementary key B. Moreover, the intermediary service 204 also maintains a key C' that allows it to communication in a secure fashion with the issuing institution 110, which maintains a key C. Of note, however, is the ability of the acquirer 108 and the issuing institution 110 to exchange encrypted messages or portions of messages through the intermediary service without allowing the service to read or otherwise act on the contents of the messages. For example, certain portions of the point of purchase information from the initial authorization request (e.g., the specific products being purchased) may be encrypted by the acquirer 108 using an encryption key D. When the intermediary services 204 receives messages or portions of messages that are encrypted, the service copies the encrypted messages or portions of messages and forwards the copied messages to the issuing institution 110. The issuing institution 110 is able to decrypt the encrypted message or portion of the message using key D'. Similarly, the issuing institution 110 may encrypt account information using key D so that the information may be read only by the acquirer 108. An advantage of this is that the intermediary service 204 never has usable access to the encrypted information. This allows the acquirer to retain control over non-essential customer information, such as certain point of purchase information, and increases the privacy of the information. It also allows the issuing institution to pass certain account information, such as the card number and PIN number of a customer's debit card, to the acquirer 108, thereby allowing the acquirer to process financial transactions that might not have been previously available to the acquirer (e.g., such as during an online purchase).

From the foregoing, it will be appreciated that specific embodiments of the invention have been described herein for purposes of illustration, but that various modifications may be made without deviating from the invention. For example, those skilled in the art will further appreciate that the depicted flow charts may be altered in a variety of ways. The order of the steps may be rearranged, steps may be performed in parallel, steps may be omitted, or other steps may be included. Accordingly, the invention is not limited except as by the appended claims.

We claim:

1. A method for processing financial transaction data in a computing system including a processor and an associated storage area, the method comprising:
    receiving from a requester an initial authorization request generated as a result of a transaction at a point of purchase, wherein the initial authorization request includes identifying information and details of an associated purchase transaction, wherein the identifying information includes a purchaser identifier;
    determining that the initial authorization request is associated with an intermediary service based on the identifying information;
    providing at least a part of the initial authorization request to the intermediary service;
    receiving a message including account information associated with an issuing institution from the intermediary service in response to the at least a part of the initial authorization request, the message including a first part encrypted according to a first encryption method and a second part encrypted according to a second encryption method, the first encryption method and the second encryption method selected such that the intermediary service is capable of decrypting the first part and is not capable of decrypting the second part;
    generating a modified authorization request based on the initial authorization request and the received account information by adding the received account information to the initial authorization request; and
    transmitting the modified authorization request to the issuing institution to request approval of the transaction.

2. The method of claim 1, wherein the requester is the point of purchase.

3. The method of claim 1, wherein the purchaser identifier comprises track 1 data associated with an identification card.

4. The method of claim 1, wherein transmitting the modified authorization request to the issuing institution comprises transmitting the modified authorization request to a payment association capable of forwarding the modified authorization request to the issuing institution.

5. The method of claim 1, wherein determining that the initial authorization request is associated with the intermediary service comprises determining that the purchaser identifier is included in a predetermined set of purchaser identifiers.

6. The method of claim 1, further comprising:
    receiving an authorization message in response to the modified authorization request; and
    providing the received authorization message to the intermediary service.

7. The method of claim 6, further comprising:
    storing at least a portion of the initial authorization request in association with at least a portion of the modified authorization request and the received authorization message in order to create an audit record.

8. The method of claim 1, wherein the account information is encrypted such that a first portion of the account information is encrypted using a first encryption method and a second portion of the account information is encrypted using a second encryption method.

9. The method of claim 1, wherein the account information is encrypted so that the intermediary service is unable to access the account information.

10. The method of claim 1, wherein the initial authorization request is a first initial authorization request and further comprising:
    receiving a second initial authorization request;
    determining that the second initial authorization request is not associated with the intermediary service; and
    transmitting the second initial authorization request to the issuing institution.

11. The method of claim 1, further comprising:
    receiving a rejection message from the issuing institution in response to the modified authorization request; and
    canceling the transaction in response to the rejection message.

12. The method of claim 1, further comprising:
    storing the details of the associated purchase transaction;
    receiving an authorization message; and
    transmitting the details of the associated purchase transaction and at least a part of the authorization message to the intermediary service.

13. A system for processing financial transaction data, the system comprising:
    a processor;
    a storage component coupled to the processor;
    a requester communication module configured to receive an initial authorization request from a requester, wherein the initial authorization request includes identifying information including a purchaser identifier;
    an evaluation module configured to determine whether the initial authorization request is associated with an intermediary service based on the identifying information;
    an intermediary service communication module configured to transmit at least a part of the data in the initial authorization request to the intermediary service and to receive a message including account information associated with an issuing institution from the intermediary service in response, the message including a first part encrypted according to a first encryption method and a second part encrypted according to a second encryption method, the first encryption method and the second encryption method selected such that the intermediary service is capable of decrypting the first part and is not capable of decrypting the second part;
    an authorization request generator module configured to generate a modified authorization request based on the initial authorization request and the received account information by adding the received account information to the initial authorization request; and an authorizer communication module configured to transmit the modified authorization request to the authorizing institution.

14. The system of claim 13, wherein the initial authorization request includes a first section encrypted using a first encryption method and a second section encrypted using a second encryption method.

15. The system of claim 13, wherein the evaluation module determines that the initial authorization request is associated with the intermediary service by determining that the purchaser identifier includes a specified prefix.

16. The system of claim 13, wherein:
the authorizer communication module is further configured to receive an authorization message from the authorizing institution in response to the modified authorization request;
the intermediary service communication module is further configured to provide the received authorization message to the intermediary service; and
the requester communication module is further configured to provide the received authorization message to the requester.

17. The system of claim 16, wherein the storage component is further configured to store at least a portion of the initial authorization request in association with at least a portion of the modified authorization request and the received authorization message in order to create an audit record.

18. The system of claim 13, wherein the authorizer communication module is further configured to cancel the transaction in response to receiving a rejection message from the authorizing institution.

19. The system of claim 13, wherein:
the initial authorization request includes transaction information;
the storage component is configured to store the transaction information; and
the intermediary service communication module is further configured to transmit the stored transaction information and at least a part of the authorization message to the intermediary service.

20. The system of claim 13, wherein the purchaser identifier is an identification code conveyed from a radio frequency identification (RFID) tag or a module in a mobile device supporting near field communications (NFC).

21. The system of claim 13, wherein the intermediary service communication module is further configured to decrypt account information, so that the account information may be conveyed across the intermediary service in an encrypted format.

22. A method for processing financial transaction data in a computing system having a processor and a memory, the method comprising:
receiving an initial authorization request to receive credit for purposes of a transaction, wherein the initial authorization request includes a customer identifier;
communicating with an intermediary service to obtain account information based on the initial authorization request, wherein the account information is conveyed across the intermediary service in an encrypted format from an issuer of a financial instrument associated with the customer, the account information conveyed in a message having a first part encrypted according to a first encryption method and a second part encrypted according to a second encryption method, the first encryption method and the second encryption method selected such that the intermediary service is capable of decrypting the first part and is not capable of decrypting the second part;
decrypting the obtained account information;
generating a modified authorization request based on the initial authorization request and the decrypted account information by adding the received account information to the initial authorization request; and
providing the modified authorization request to the issuer of the financial instrument via a payment association.

23. The method of claim 22, wherein communicating with the intermediary service comprises:
transmitting at least a part of the initial authorization request to the intermediary service; and
in response, receiving an account information message including the account information.

24. The method of claim 22, wherein the customer identifier is an identification code conveyed from a radio frequency identification (RFID) tag or a module in a mobile device supporting near field communications (NFC).

25. The method of claim 22, further comprising:
receiving an authorization message from the issuer via the payment association; and
providing at least a part of the authorization message to the intermediary service.

26. The method of claim 25, further comprising:
storing at least a portion of the initial authorization request in association with at least a portion of the modified authorization request and the received authorization message in order to create an audit record.

27. The method of claim 22, further comprising determining whether the initial authorization request is associated with the intermediary service, wherein communicating with the intermediary service comprises:
sending data included in the initial authorization request to the intermediary service in response to determining that the initial authorization request is associated with the intermediary service; and
in response, receiving a message including the account information from the intermediary service.

28. The method of claim 22, wherein the initial authorization message includes transaction information and further comprising:
storing the transaction information; and
transmitting the stored transaction information to the intermediary service in response to receiving an authorization message from the issuer.

29. A non-transitory computer-readable medium containing instructions for processing financial transaction data, by a method comprising:
receiving from a requester an initial authorization request generated as a result of a transaction at a point of purchase, wherein the initial authorization request includes identifying information and details of an associated purchase transaction, wherein the identifying information includes a purchaser identifier;
determining that the initial authorization request is associated with an intermediary service based on the identifying information;
providing at least a part of the initial authorization request to the intermediary service, the at least part of the initial authorization request including a first part encrypted according to a first encryption method and a second part encrypted according to a second encryption method, the first encryption method and the second encryption method selected such that the intermediary service is capable of decrypting the first part and is not capable of decrypting the second part;
receiving a message including account information associated with an issuing institution from the intermediary service in response to the at least a part of the initial authorization request, the message including a first part encrypted according to a first encryption method and a second part encrypted according to a second encryption method, the first encryption method and the second encryption method selected such that the intermediary service is capable of decrypting the first part and is not capable of decrypting the second part;

generating a modified authorization request based on the initial authorization request and the received account information by adding the received account information to the initial authorization request; and transmitting the modified authorization request to the issuing institution to request approval of the transaction.

30. The method of claim 29, wherein transmitting the modified authorization request to the issuing institution comprises transmitting the modified authorization request to a payment association capable of forwarding the modified authorization request to the issuing institution.

31. The computer-readable medium of claim 29, wherein the initial authorization request is a first initial authorization request, the method further comprising:

receiving a second initial authorization request;

determining that the second initial authorization request is not associated with the intermediary service; and transmitting the second initial authorization request to the issuing institution.

32. The computer-readable medium of claim 29, the method further comprising:

receiving a rejection message from the issuing institution in response to the modified authorization request; and canceling the transaction in response to the rejection message.

33. The computer-readable medium of claim 29, the method further comprising:

storing the details of the associated purchase transaction;

receiving an authorization message; and transmitting the details of the associated purchase transaction and at least a part of the authorization message to the intermediary service.

* * * * *

UNITED STATES PATENT AND TRADEMARK OFFICE
CERTIFICATE OF CORRECTION

PATENT NO.         : 8,244,643 B2                           Page 1 of 1
APPLICATION NO.    : 12/557453
DATED              : August 14, 2012
INVENTOR(S)        : Todd R. Coulter et al.

It is certified that error appears in the above-identified patent and that said Letters Patent is hereby corrected as shown below:

On title page 2, item [56], under "OTHER PUBLICATIONS", in column 2, line 13, delete "Mail-Date" and insert -- Mail Date --, therefor.

In column 1, line 12, delete "12/577,457" and insert -- 12/557,457 --, therefor.

Signed and Sealed this
Fifteenth Day of January, 2013

David J. Kappos
*Director of the United States Patent and Trademark Office*